United States Patent [19]

Ito

[11] 4,442,464
[45] Apr. 10, 1984

[54] DEVICE FOR DETECTING A SPACE BETWEEN ADJACENT BLOCKS OF DATA RECORDED IN A RECORDING MEDIUM

[75] Inventor: Takeshi Ito, Yokohama, Japan

[73] Assignee: Tokyo Shibaura Denki Kabushiki Kaisha, Kawasaki, Japan

[21] Appl. No.: 361,789

[22] Filed: Mar. 25, 1982

Related U.S. Application Data

[63] Continuation of Ser. No. 151,916, May 21, 1980, abandoned.

[30] Foreign Application Priority Data

May 24, 1979 [JP] Japan .................................. 54-64191

[51] Int. Cl.³ ...................... G11B 15/16; G11B 15/52; G11B 19/10
[52] U.S. Cl. .................................. 360/72.1; 360/74.4
[58] Field of Search ........................ 360/71, 72.1, 72.3, 360/73, 74.4, 137; 179/6.14

[56] References Cited

U.S. PATENT DOCUMENTS

| 4,198,664 | 4/1980 | Yasunaga et al. ...................... 360/73 |
| 4,210,940 | 7/1980 | Prysby et al. ........................ 360/72.3 |
| 4,225,890 | 9/1980 | Takenaka et al. ................... 360/72.1 |
| 4,241,364 | 12/1980 | Shiga ................................. 360/72.1 |
| 4,290,090 | 9/1981 | Yamamoto et al. ............... 360/72.1 |

*Primary Examiner*—Bernard Konick
*Assistant Examiner*—Donald McElheny, Jr.
*Attorney, Agent, or Firm*—Finnegan, Henderson, Farabow, Garrett & Dunner

[57] ABSTRACT

A detector for detecting a space between blocks of data recorded on a recording medium, comprising a recording medium with a given speed, which provides a reproduction signal corresponding to an information recorded on the recording medium and issues a transport operation indicating signal; a discrimination means for discriminating the transport operation indicating signal, which provides a filter characteristic changing signal in accordance with the transport operation indicating signal; and a variable filter means for filtering the reproduction signal and providing a timing signal, of which filtering characteristic is changed in accordance with the filter characteristic changing signal. An operation mode of the recording medium transport means is changed by a transport control signal corresponding to the timing signal.

47 Claims, 23 Drawing Figures

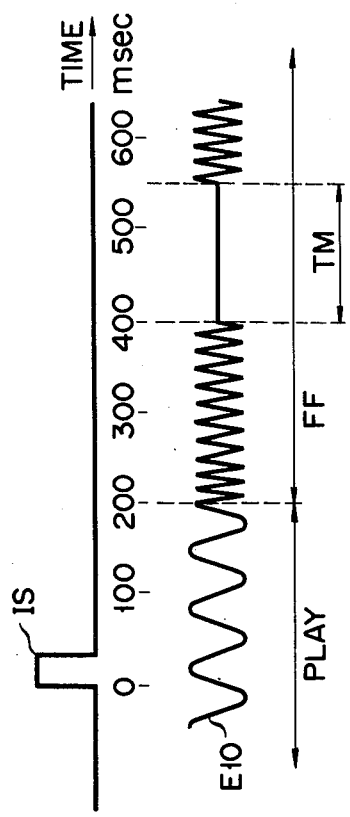
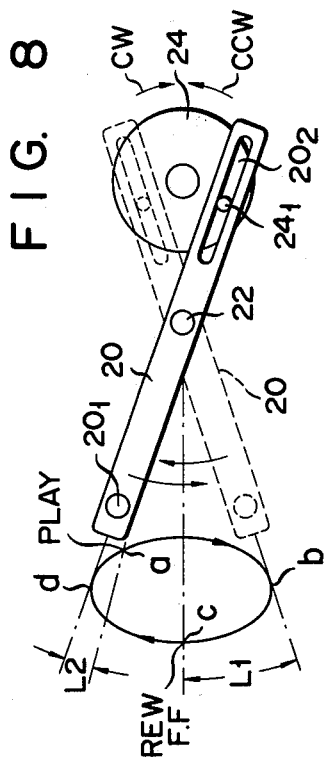

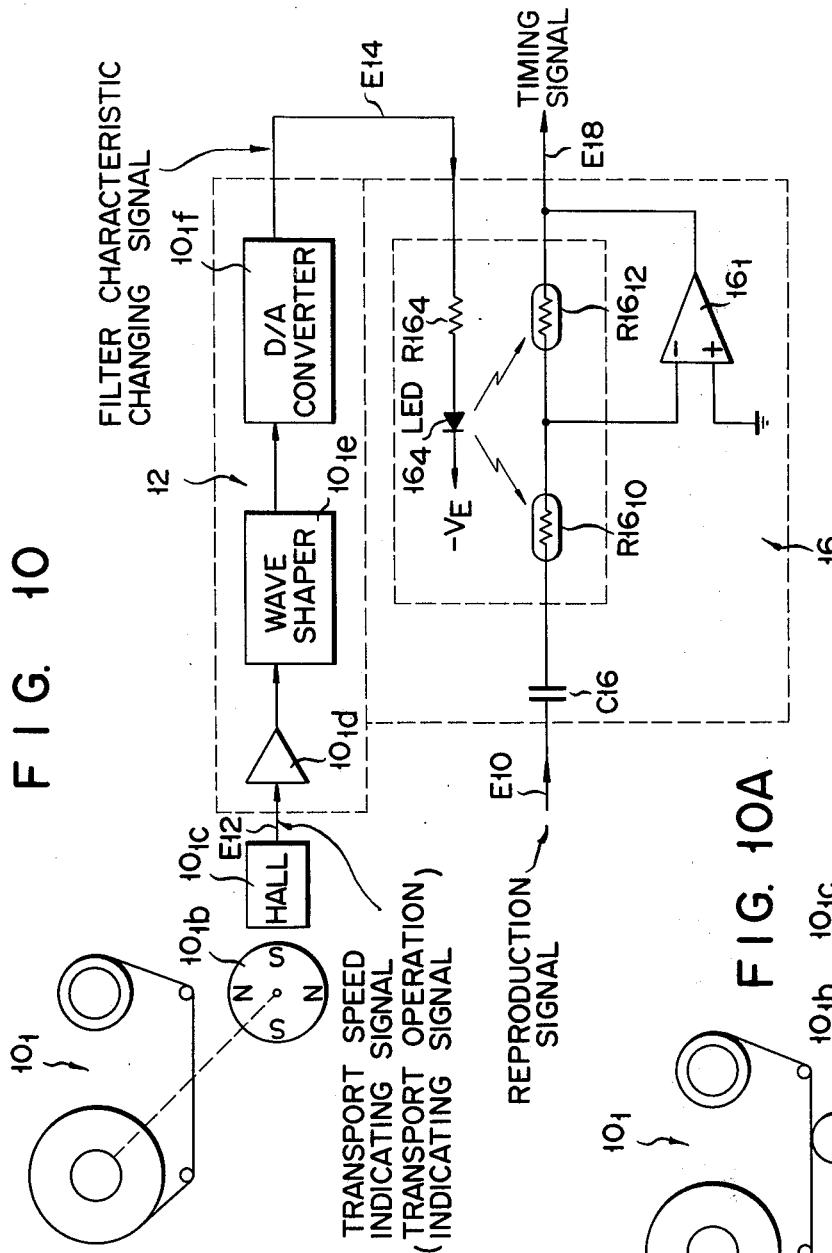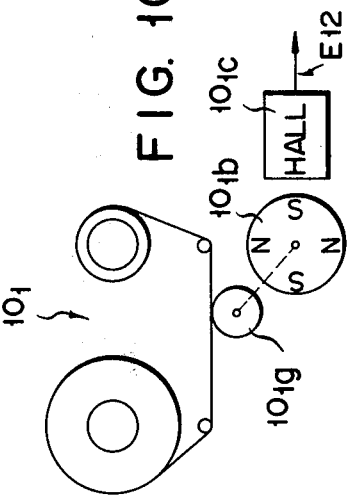

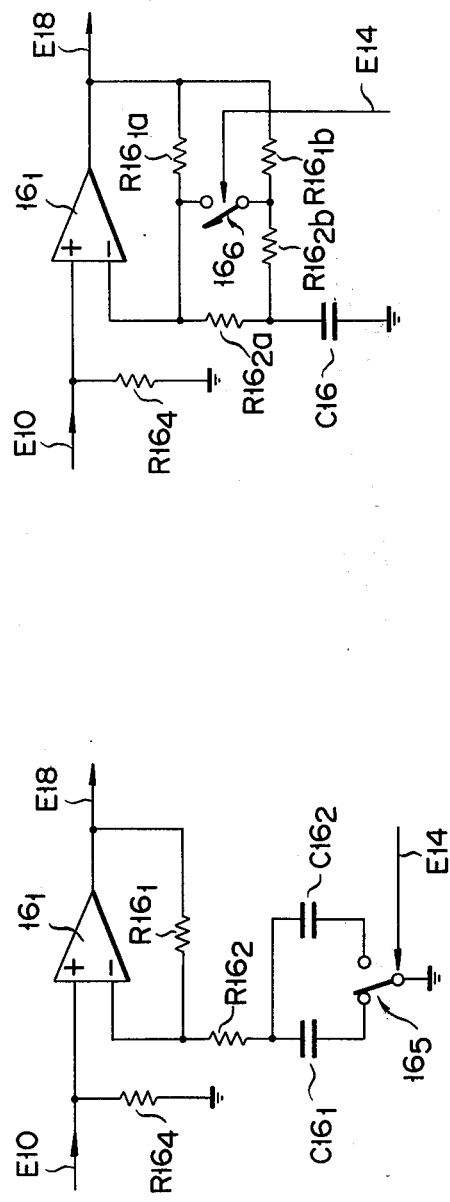

DEVICE FOR DETECTING A SPACE BETWEEN ADJACENT BLOCKS OF DATA RECORDED IN A RECORDING MEDIUM

This is a continuation of application Ser. No. 151,916, filed May 21, 1980 now abandoned.

FIELD OF THE INVENTION

This invention relates to improvements to a device for detecting a space between adjacent blocks of data recorded in a magnetic tape. This space detector is adapted to be used particularly with a device for automatically selecting a desired music piece from among those recorded in the magnetic tape.

BACKGROUND OF THE INVENTION

In recent years, combination radio-cassette tape records/players have begun rapidly enjoying wide acceptance. This radio-cassette tape record/player must have a large power output have high fidelity (HiFi) and incorporate many different functions.

In the field of audio equipment, it is desired to develop a device which can automatically select a desired music piece from among those recorded in a magnetic tape and allow the user himself (or herself) to enjoy the music and, if desired, to sing along. Also tape record/players using a tape recording of an orchestral accompaniment devoid of a vocal performance are enjoying an unprecedented boom.

The radio-cassette tape record/players must be able to produce a vocal-free orchestral relatively easily. A known cuing apparatus or an automatic music piece selector developed from said curing apparatus enables the ordinary tape recorder/player to meet the this requirement with relative ease. However, a tape recorder/player with such an apparatus must not simply cope with a demand for the production of a vocal-free orchestral accompaniment, but it should also be capable at the same time of carrying out any operation mode reliably without an erroneous behavior such as a failure to select a desired music piece.

The known automatic music piece selector (even a simple cuing apparatus is regarded as similar to such a selector) comprises a coincidence detector which counts detection pulses issued from an inter-music piece space detector (the inter-music piece space detector detects a signal-free space between the respective adjacent music pieces), compares the counted number of detection pulses with a value preset in a designator of the sequential number of a music piece (hereinafter referred to as a "music piece sequence designator"), and sends forth a coincidence signal when the compared numbers accord with each other or indicate a prescribed conforming relationship.

The above-mentioned automatic music piece selector automatically selects a desired music piece by actuating an electro-mechanical conversion mechanism, such as a plunger, by said coincidence signal and changing over the operation mode of a tape recorder or player.

This automatic music piece-selecting operation is carried out by letting a tape transport proceed at high speed (fast forward or rewind mode) until a specified or desired music piece is detected, stopping the high speed tape transport after detection of a desired music piece, and finally changing the operation mode to the specified speed of the tape transport (playback mode).

The above-mentioned conventional automatic music piece selector automatically selects only one music piece by a single operation. An operation of detecting an inter-music piece space is undertaken while the tape is made to run at high speed. Therefore, said conventional music piece selector is only capable of carrying out the simplest function among those which are possibly effected by such device.

Moreover, the prior art music piece selector had the serious drawback that a device for detecting a space between adjacent music pieces or data recorded in a tape (hereinafter referred to as a "space detector") sometimes failed to detect the space. The known space detector comprises a clipper which amplifies a playback signal up to a clipping level, a rectifier which rectifies an output signal from the clipper, a Schmitt trigger which distinguishes between the levels of rectified outputs from the rectifier, and a differentiating circuit which converts an output from the Schmitt trigger into a pulse signal. The above-mentioned prior art space detector is generally of the type which generates a pulse signal for each space between adjacent music pieces or data recorded in a tape by utilizing the different levels of signals denoting a recorded signal portion representing a music piece and a signal-free space between adjacent recorded music pieces or data. The arrangement of such a space detector is set forth in the Japanese Patent Disclosure No. 152,210 (1977) on an apparatus for detecting a space between adjacent music pieces recorded in a tape used with a tape recorder.

There are two reasons that the prior art space detector failed to reliably detect an inter-music piece space, possibly leading to an erroneous action. One of these two reasons is low frequency noises such as hums which generally arise from a signal-free space between adjacent music pieces recorded in a tape. Where a tape runs at a high speed for detection of an inter-music piece space, these low frequency noises are undesirably reproduced with a high level and at an appreciably high frequency of, for example, about 3 KHz. Such high frequency noises arising from the signal-free inter-music piece space are sometimes detected without being distinguished from music signals. Therefore, the space detector fails to reliably detect an inter-music piece space.

The other of the two reasons is related to the timing in which the changeover mechanism of a tape recorder is actuated for a desired operation mode. When a tape player is changed over from the playback mode to the fast forward mode (FF mode) for the purpose of selecting a music piece while another music piece is still being reproduced, coincidence of the space count and the preset value does not always take place between the point of time at which the mechanical system begins to be operated and the point of time at which the electric system begins to be actuated.

The conventional space detector controls the operation of a tape recorder by an output denoting the detection of an inter-music piece space (strictly speaking, a signal showing a coincidence between a connected number of pulses issued from the space detector and a value preset in the music piece sequence designator). At this time, the operation of the space detector is controlled by a discrimination signal whose logic level varies with the operation mode of the tape player mechanism. For example, is set at "1" at the time of, for example, the playback mode, and at "0" at the time of the fast forward (FF) mode. If, therefore, no coincidence is ensured between the time when the mechanical system of a tape recorder begins to be operated and the time when the electric system thereof begins to be actuated, then the space detector undesirably takes an erroneous action.

Another problem is that where an electro-mechanical conversion mechanism, such as a plunger driven by a signal denoting an inter-music piece, space is actuated, then the so-called plunger noises arise, sometimes causing the space detector to take an erroneous action.

In recent years, an automatic, highly advanced music piece selector has been required to pick up not merely only one music piece, but also a plurality of music pieces at once. This requirement further aggravates the aforesaid difficulties. Moreover, a new problem characteristic of the selection of plural music pieces is now brought about. Where a single music piece is to be selected, it is usually sufficient if an inter-music piece space is detected simply by the fast forward mode. Conversely, where plural music pieces are to be picked up, it is necessary to detect an inter-music piece space not only during the fast forward mode, but also during the playback mode. Therefore, it has become impossible to simply treat low frequency noises such as hums arising from an inter-music piece space.

SUMMARY OF THE INVENTION

It is accordingly the object of this invention to provide a device for exactly detecting one or more of plural blocks of data recorded in a recording medium such as a magnetic tape regardless of the speed at which the tape travels. Or more concretely, the object of the invention is to provide a space detector which can unfailingly detect a space between adjacent music pieces or data blocks recorded in the magnetic tape without being affected by low frequency noises arising from an inter-music piece space, regardless of whether the magnetic tape runs at the fast forward mode or playback mode.

To achieve the above-mentioned object, a detector according to the invention comprises a variable filter means whose frequency characteristic is of the lower frequency range decreasing type and whose cut-off frequency is varied dependent on the transport speed of the recording medium. More specifically, the filter means is a low-pass filter or the like, and its cut-off frequency $f_c$ at the $-3$ dB response point can be changed. For example, the frequency $f_c$ is high at fast forward (FF) mode and low at playback mode so as to prevent an erroneous detecting of the spacing portion due to low frequency noises, etc.

BRIEF DESCRIPTION OF THE DRAWINGS

This invention will be more fully understood from the following detailed description taken in conjunction with the accompanying drawings, in which:

FIGS. 7A and 7B are timing charts illustrating the operation of the masking circuit $18_5$ shown in FIGS. 3, 4 or 5;

FIG. 8 explains how a muting phenomenon occurs with a mode change of the tape transport mechanism $10_1$ shown in FIG. 3;

FIGS. 10, 10A and 11 show a modification of the variable filter means 16, whose cut-off frequency $f_c$ is varied according to the tape transporting speed;

FIGS. 12 to 18 show various modifications of the variable filter means 16; and

DETAILED DESCRIPTION OF THE INVENTION

Figure 1:
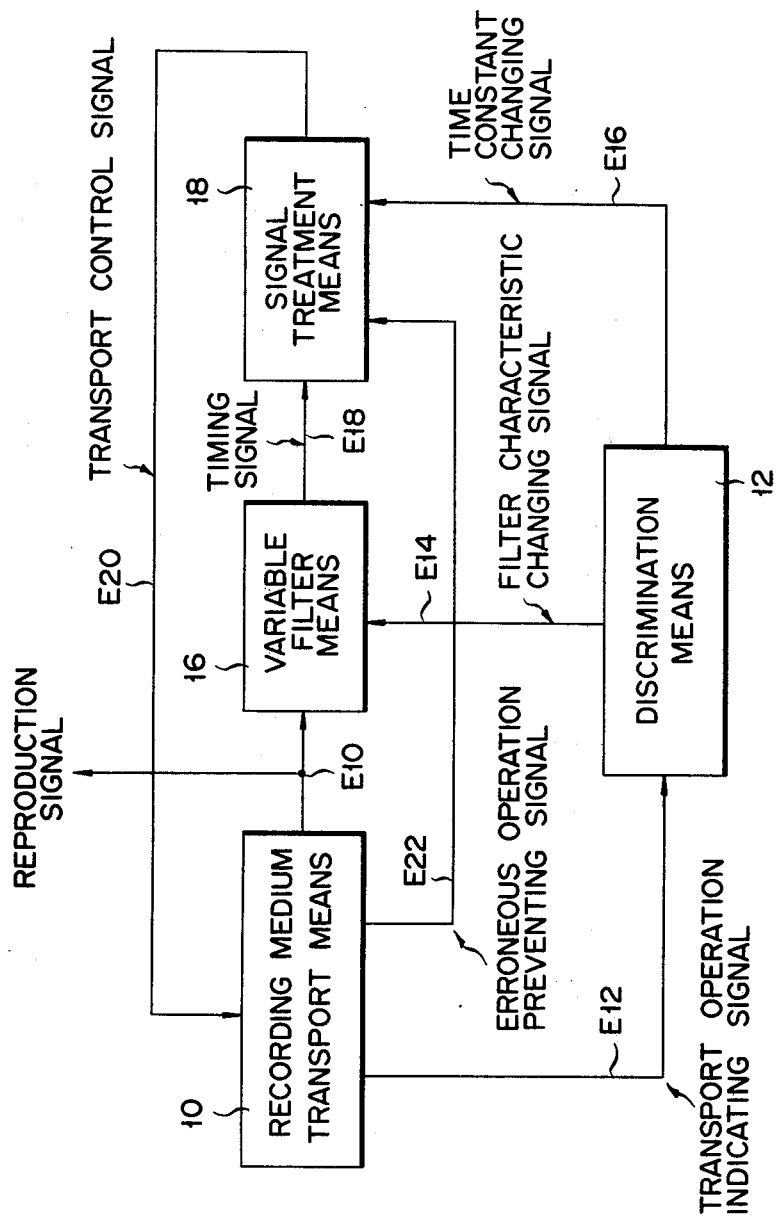
FIG. 1 shows a basic configuration of a detector embodying the invention.

Now, preferred embodiments of the invention will be described. To avoid a redundant description, common or similar reference numerals are used for designating common or similar elements. That is, any components or any elements recited by like reference numerals throughout the drawings are exchangeable directly or with minor changes that would not be difficult for one skilled in the art.

FIG. 1 shows a basic configuration of a detector of this invention. A recording medium transport means 10 includes, for example, a conventional tape transport mechanism, a control mechanics or control electronics for controlling the operation mode of the transport mechanism and a signal treatment electronics. The mechanism transports a recording medium, e.g. a music-cassette tape, at one of two predetermined constant speeds. In the standard compact cassette the constant speed of a playback/recording mode is 4.8 cm/s, and a higher speed corresponds to cuing, fast forward (FF) or rewind (REW) mode of the transport mechanism. When the music cassette tape is transported, the signal treatment electronics or playback equalizer (EQ) amplifier produces a playback signal or reproduction signal E10 in the any mode, playback, cue, FF or REW, unless a muting circuit is activated which is provided within signal treatment electronics of the tape recorder/player (not shown). The control mechanics or the control electronics of the transport means 10 issues a transport operation indicating signal E12 which indicates the operation mode of the transport mechanism. For example, when the operation mode is the playback mode, the signal E12 is logical "1", and when it is the FF mode the signal E12 is logical "0".

The transport operation indicating signal E12 is supplied to a discrimination means 12. The means 12 is generally formed of a mechanical or electrical switch interlocking with the control mechanics or the control electronics. It provides a filter characteristic changing signal E14 and a time constant changing signal E16 upon receipt of signal E12.

The reproduction signal E10 and the filter characteristic changing signal E14 are supplied to a variable filter means 16. The means 16 is formed of, for example, a saturation amplifier whose frequency characteristic is a high-pass filter type and whose cut-off frequency is variable. The cut-off frequency varies according to the signal E14. The means 16 is saturated with large amplitude of the signal E10 when the transport means 10 is set to the high speed tape transport mode, i.e. FF mode etc., but not always saturated when the transport means 10 is set to the playback mode. The means 16 provides a timing signal E18 which corresponds to the filtered-signal of E10.

The timing signal E18 is supplied to a signal treatment means 18. The means 18 includes a bistable multivibrator or Schitt trigger circuit of variable time constant type. The signal E18 triggers the bistable multivibrator, and then the means 18 provides a transport control signal E20.

Figure 2A:
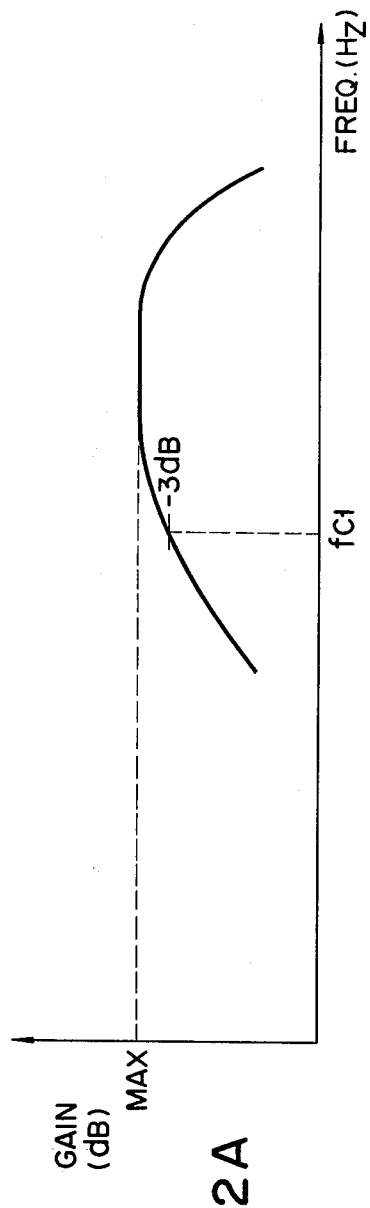
FIG. 2A shows a frequency characteristic of a variable filter means 16 shown in FIG. 1 in which a cut-off frequency $f_c$ is set at high value ($f_{c1}$)
Figure 2B:
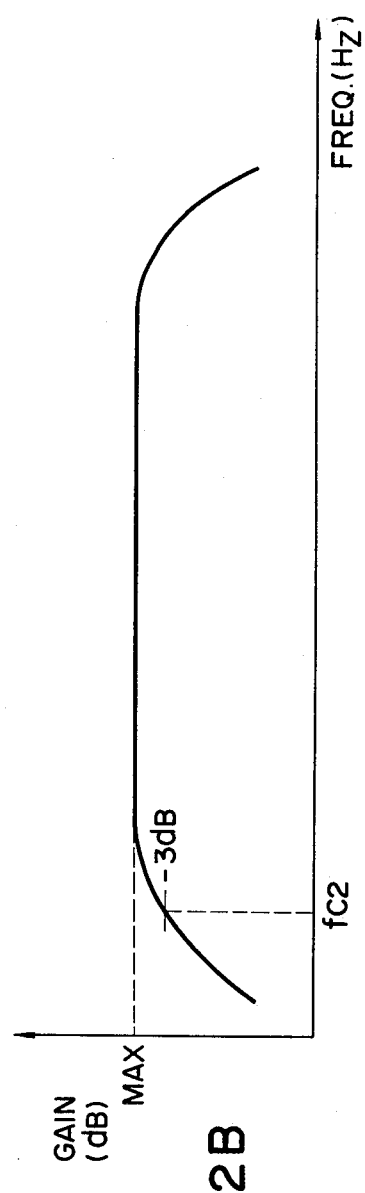
FIG. 2B shows a frequency characteristic of the variable filter means 16 in which the cut-off frequency $f_c$ is set at low value ($f_{c2}$)

The actual time constant of the bistable multivibrator is varied by the time constant changing signal E16. For example, when the tape transport mechanism of the recording medium transport means 10 transports a music cassette tape at 4.8 cm/s, the logical level of the transport operation indicating signal E12 is "1". In this case, the cut-off frequency $f_{c2}$ of the high-pass filter in the variable filter means 16 is relatively low as shown in FIG. 2B, and the time constant of the bistable multivibrator of the means 18 is relatively large. By contrast, when the tape transport speed is higher than 4.8 cm/s as in the FF mode, the logical level of the signal E12 becomes "0" and the cut-off frequency rises to $f_{c1}$ as shown in FIG. 2A. Then, the time constant of the multivibrator is reduced to a value suitable for the operational condition of the multivibrator with the tape transport speed.

The transport control signal E20 is fed back to the control mechanics or control electronics of the recording medium transport means 10. Suppose the tape transport mechanism transports a music cassette tape in the FF mode. Then, the cut-off frequency $f_{c1}$ is high as shown in FIG. 2A. Provided with such a low-cut type frequency characteristic, the variable filter means 16 does not respond to a noise component such as hum in low frequency range. Thus, only the musical component without low frequency noise is passed through the means 16 and the timing signal E18 relating to the music containing no noise is supplied to the signal treatment means 18. When a spacing portion or no musical signal recorded portion between two different music sources recorded on the music cassette passes by the magnetic head, the amplitude of the reproduction signal E10 decreases, and the amplitude of the signal E18 also decreases. When the amplitude of the signal E18 become lower than a given level, the bistable multivibrator of the means 18 is triggered to supply the transport control signal E20 to the transport means 10. In response to the signal E20 the means 10 stops the tape transport operation of FF mode, whereby the operation mode of the tape transport mechanism is changed to stop or playback mode.

In the FIG. 1 configuration there is also provided means for preventing an erroneous operation due to a mechanical delay response in the recording medium transport means 10. That is, the means 10 has a device to provide an erroneous operation preventing signal E22 when the tape transport mechanism is activated to change the operation mode of the mechanism. The signal E22 is supplied to the signal treatment means 18 immediately after the mechanism is activated. The transport control signal E20 is not produced when the signal E22 is provided. Accordingly, in any situation, the signal E20 is not derived from the means 18 so long as the signal E22 lasts.

The erroneous operation preventing means is useful, for example, in the following case. Assume now that the tape transport mechanism transports a tape in playback mode and then in the FF mode. The transport operation indication signal E12 is then changed from logical "1" to logical "0". This logical level change elevates the cut-off frequency of the variable filter means (high-pass filter) 16 and decreases the time constant of the means 18. Further, the mechanical actuation of the tape transport mechanism occurs after the logical level change of the signal E12. Without erroneous operation preventing means, the level of the timing signal E18 distributed over the audio frequency range is instantly lowered by the level change of the signal E12, regardless of whether the present playback position is not the spacing portion, and then the level down of the signal E18 will cause the means 18 to erroneously provide the signal E20.

Figure 3:
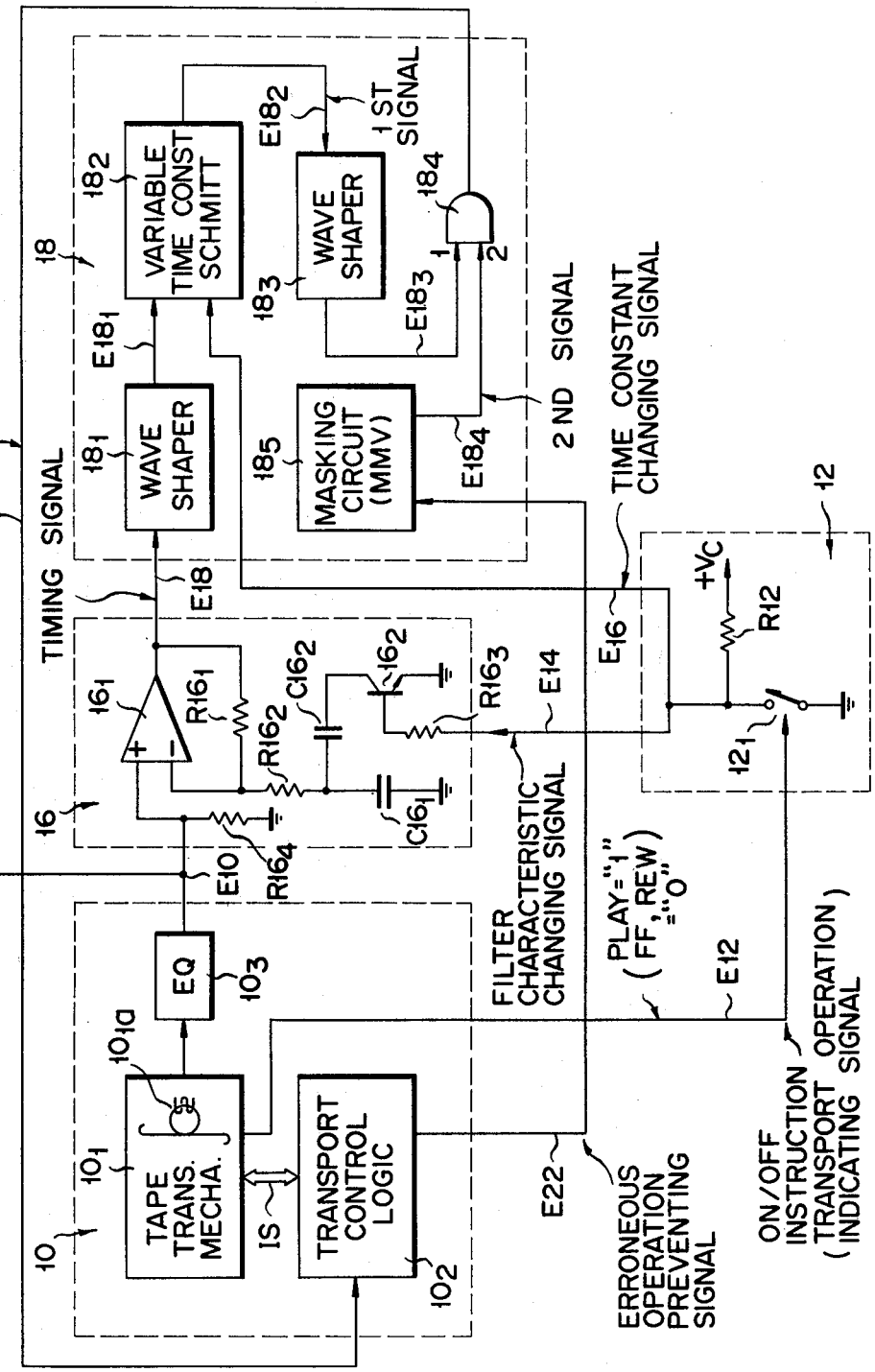
FIG. 3 shows a detail block diagram of FIG. 1.

FIG. 3 is a detail block diagram of FIG. 1 configuration. The recording medium transport means 10 includes a tape transport mechanism $10_1$ provided with a playback head $10_{1a}$, a control electronics or transport control logic $10_2$ for controlling the mechanism $10_1$ through a instruction signal IS and an playback equalizer $10_3$ for equalizing and amplifying an output of the head $10_{1a}$ to provide the reproduction signal or playback signal E10.

The playback signal E10 is applied to the non-inverted input of an operational amplifier $16_1$ included in the variable filter means 16. The output of the amplifier $16_1$ is connected through a resistor $R16_1$ to the inverted input thereof. The inverted input of the amplifier $16_1$ is grounded via a series circuit of a resistor $R16_2$ and a capacitor $C16_1$. The junction point of the resistor $R16_2$ and the capacitor $C16_1$ is connected to the collector of an NPN transistor $16_2$ via a capacitor $C16_2$. The emitter of the transistor $16_2$ is grounded and the base thereof is applied with the filter characteristic changing signal E14 through a resistor $R16_3$. The non-inverted input of the amplifier $16_1$ is grounded through a resistor $R16_4$. The transistor $16_2$ acts as a switch. It is turned-on by logical "1" of the signal E14 and turned-off by logical "0" of the signal E14.

Suppose the amplifier $16_1$ is a so-called "ideal operational amplifier" with its gain being regarded as infinite. Then, a transfer function G16 between the signal E10 to the signal E18 will be as follows:

(a) The signal E14 is logical "0". This corresponds, for example, to the FF mode of the tape transport mechanism $10_1$. The transistor $16_2$ is in OFF state. In this condition, a transfer function $G16_1$ is expressed as:

$$G16_1 = 1 + \frac{SC16_1 R16_1}{SC16_1 R16_2 + 1} \quad (1)$$

$$= 1 + \frac{ST1}{ST2 + 1}$$

where $S = j2\pi f$ (Hz), $T1 = C16_1 R16_1$ and $T2 = C16_1 R16_2$. The property of the function $G16_1$ corresponds to FIG. 2A. The maximum gain of the function $G16_1$ is obtained from the equation (1) as follows:

$$\lim_{S \to \infty} G16_1 = 1 + \frac{T1}{T2} = 1 + \frac{R16_1}{R16_2} \text{ (dimension-less)} \quad (2)$$

or $$G16_{1\,max} = 20 \log_{10}\left(1 + \frac{R16_1}{R16_2}\right) \text{ (dB)} \quad (2A)$$

The cut-off frequency $f_{c1}$ at the level of $-3$ dB point from the maximum gain is also obtained from equation (1). For simplicity's sake, we assume that in equation (1):

$$1 << \frac{ST1}{ST2 + 1} \quad (3)$$

Then, equation (1) is simplified as below.

$$G16_1 \simeq \frac{ST1}{ST2 + 1} \quad (1A)$$

From equation (1A) the cut-off frequency $f_{c1}$ is represented by:

$$f_{c1} \simeq \frac{1}{2\pi T2} = \frac{1}{2\pi C16_1 R16_2} \quad (4)$$

In a model PC-X40 manufactured by Toshiba Co., in which the detector of this invention is applied, the frequency $f_{c1}$ is approximately 16 KHz in order to sufficiently decrease the lower frequency gain of the amplifier $16_1$ so that a hum component in the playback signal E10, which is produced in the FF mode, will not have its frequency and level elevated. The detector is therefore prevented from operating erroneously.

When the tape transport speed in the FF mode is about 30 to 40 times higher than the playback speed (4.8 cm/s), for example, the frequency of hum rises from 60 Hz to 1.8 KHz to 2.4 KHz and playback level of the hum component is greatly elevated. However, when the cut-off frequency $f_{c1}$ is set at more than 10 KHz, the level of the hum is suppressed by the high-pass filter operation of the variable filter means 16, thereby the level of the timing signal E18 from the amplifier $16_1$ is too low to affect the transport control signal E20.

(b) The signal E14 is logical "1". This corresponds to the playback mode of the mechanism $10_1$, and the transistor $16_2$ is in ON state. In this condition, a transfer function $G16_2$ is expressed as:

$$G16_2 = 1 + \frac{S(C16_1 + C16_2)R16_1}{S(C16_1 + C16_2)R16_2 + 1} \quad (5)$$

$$= 1 + \frac{ST3}{ST4 + 1}$$

where $S = j2\pi f$ (Hz), $T3 = (C16_1 + C16_2)R16_1$ and $T4 = (C16_1 + C16_2)R16_2$. The property of the function $G16_2$ corresponds to FIG. 2B. The maximum gain of the function $G16_1$ is obtained from equation (5) as follows:

$$\lim_{S \to \infty} G16_2 = 1 + \frac{T3}{T4} = 1 + \frac{R16_1}{R16_2} \text{ (dimension-less)} \quad (6)$$

or

-continued $$G16_{2\,max} = 20 \log_{10}\left(1 + \frac{R16_1}{R16_2}\right) \text{ (dB)} \quad (6A)$$

Here, we assume for simplicity that in equation (5):

$$1 << \frac{ST3}{ST4 + 1} \quad (7)$$

Then equation (5) is simplified as follows:

$$G16_2 \simeq \frac{ST3}{ST4 + 1} \quad (5A)$$

From equation (5A) the cut-off frequency $f_{c2}$ is represented as follows:

$$f_{c2} \simeq \frac{1}{2\pi T4} = \frac{1}{2\pi (C16_1 + C16_2)R16_2} \quad (8)$$

In said model PC-X40, the frequency $f_{c2}$ is selected to be about 330 Hz so that the flat-frequency response of the amplifier $16_1$ covers the main audio frequency range. Since the energy level of a voice and/or music source at the playback mode is between about 100 Hz to 4 KHz in most cases and the flat gain (maximum gain) of the amplifier $16_1$ is sufficiently large, an $f_{c2} \simeq 330$ Hz can provide the timing signal E18 indicating the music portion and the spacing portion. For example, where $G16_{2\,max} \simeq 50$ dB, $f_{c2} \simeq 330$ Hz and filtering characteristic is $-6$ dB/oct, the gain $G16_2$ at 60 Hz is about 35 dB. The gain $G16_2 \simeq 35$ dB at 60 Hz is large enough to indicate the existence of bass-instrument music, such as bass drums, in the case of said model PC-X40.

Generally, when the maximum gain $G16_{max}$ is almost constant, the following relation is preferable to prevent the erroneous operation:

$$N = (f_{c1}/f_{c2}) \gtrsim (V1/V2) \quad (9)$$

where $f_{c1}$ is the cut-off frequency at the high speed tape transport, $f_{c2}$ is the cut-off frequency at the playback or predetermined constant speed tape transport, V1 is the tape transport speed at the high speed tape transport (e.g. at the FF mode), and V2 is the playback speed (e.g. 4.8 cm/s). In the case of said model PC-X40, $f_{c1} \simeq 16$ KHz, $f_{c2} \simeq 330$ Hz and V1/V2 $\simeq$ 30 to 40. Thus, in this model, the frequency ratio $N = 16 \times 10^3/330 \simeq 48$, and relation (9) is satisfied.

The ratio N should be determined according to the closed loop gain or the transfer function G16 of the variable filter means 16, the tape transport speeds V1, V2 and so on. However, there is a suitable range of the ratio N, especially in a compact cassette tape recorder/player. If the speed ratio V1/V2 is varied from 10 to 100, the frequency ratio N is set as follows:

$$N \gtrsim 100$$

By contrast, if the ratio V1/V2 is 30 to 40 as in a compact cassette, the ratio N is selected to be:

$$N \gtrsim 40$$

The timing signal E18 derived from the amplifier $16_1$ is wave-shaped by a wave shaper $18_1$. The wave shaper $18_1$ produces a trigger pulse $E18_1$ having sharp rising edge, which is supplied to a variable time constant Schmitt trigger or a variable time constant bistable multivibrator $18_2$. The switching operation of the multivibrator $18_2$ includes a suitable hysteresis to ensure a sufficient noise margin which prevents a mis-triggering. When triggered by the pulse $E18_1$, the multivibrator $18_2$ produces a first signal $E18_2$ the pulse width of which depends on the time constant of the multivibrator $18_2$. The time constant of the multivibrator $18_2$ is varied by the time constant changing signal $E16$. This change of the time constant is carried out simultaneously with said cut-off frequency change in the variable filter means $16$ so that the pulse width of the signal $E18_2$ is well fitted to the speed at which the tape is transported by the tape transport mechanism $10_1$.

The signal $E18_2$ is wave-shaped by a wave shaper $18_3$. The shaper $18_3$ provides a pulse signal $E18_3$ having narrow pulse width arising at the level change portion of the signal $E18_2$. The signal $E18_3$ is applied to the first input of an AND gate $18_4$, while the second input thereof is supplied with a second signal $E18_4$ derived from a masking circuit $18_5$. The circuit $18_5$ may be formed of a monostable multivibrator triggered by the erroneous operation preventing signal $E22$.

The signal $E22$ is derived from the transport control logic $10_2$ when the logic $10_2$, by the instruction signal IS, instructs the mechanism $10_1$ to change its operation mode, e.g., changing FF mode to playback mode or vice versa. The logical AND of the signal $E18_3$ and $E18_4$ is supplied as the transport control signal $E20$ from the output of the AND gate $18_4$ to the logic $10_2$.

The components $18_1$ to $18_5$ constitute the signal treatment means $18$.

The discrimination means $12$ in FIG. 3 is formed of a leaf switch $12_1$ and a resistor $R12$. One end of the resistor $R12$ is applied with a positive potential $+V_c$, and the other end is grounded via the switch $12_1$. The signals $E14$ and $E16$ are obtained from the junction point of the resistor $R12$ and the switch $12_1$. The switch $12_1$ is switched, interlocking with the mechanical operation of the tape transport mechanism $10_1$. For example, the switch $12_1$ is turned-on when the mechanism $10_1$ is set to FF mode and turned-off when the mechanism $10_1$ is set to playback mode. The ON state of the switch $12_1$ makes the signals $E14$ and $E16$ have logical value "0", and the OFF state makes them have a logical value "1". Thus, the mechanical ON/OFF instruction for the switch $12_1$ is the same as the transport operation indicating signal $E12$.

Figure 4:
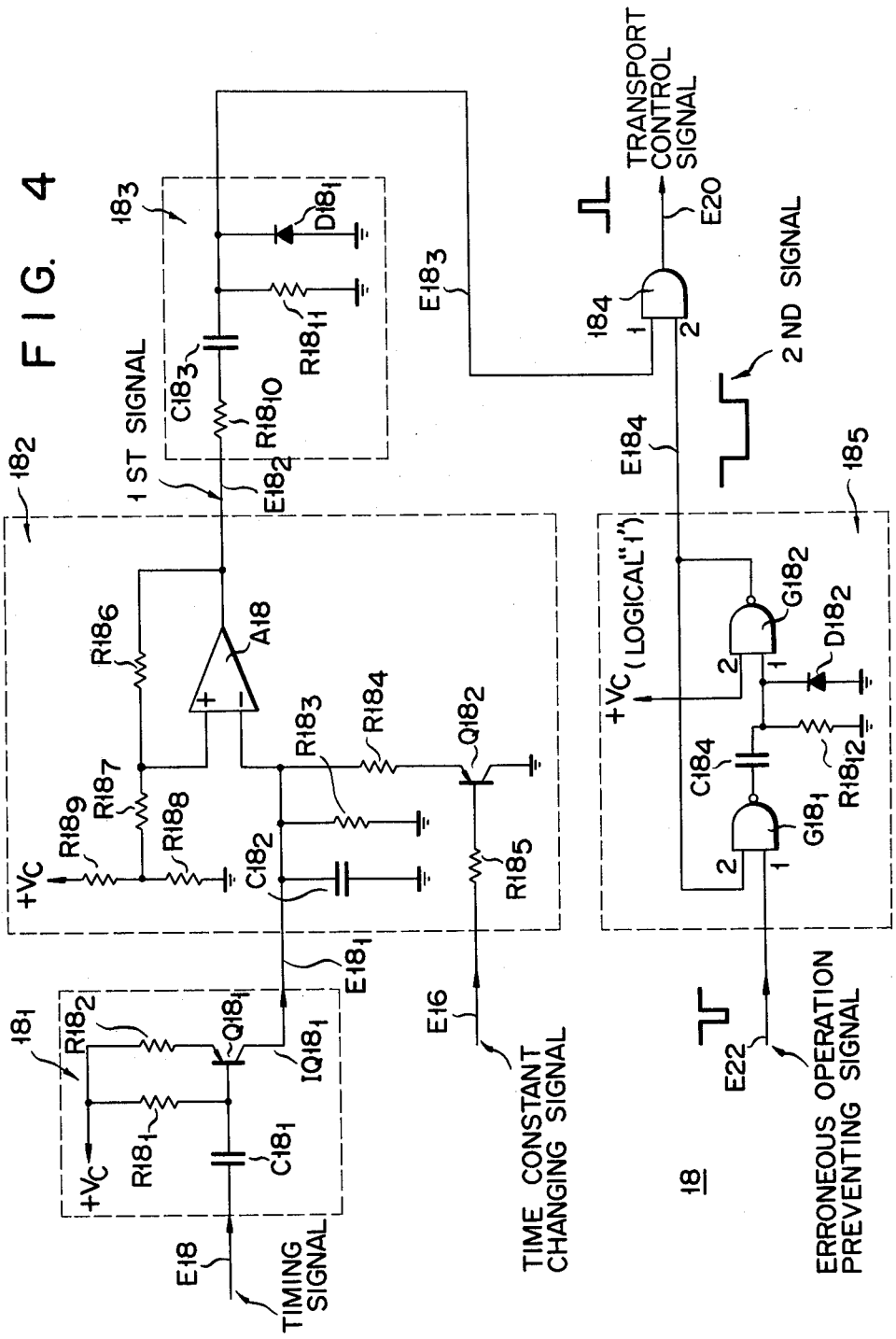
FIG. 4 shows a detailed circuit configuration of the signal treatment means 18 shown in FIG. 3.

FIG. 4 is a detail circuit configuration of the signal treatment means $18$ shown in FIG. 3. The timing signal $E18$ is supplied to the base of a PNP transistor $Q18_1$ via a capacitor $C18_1$. The base and emitter of the transistor $Q18_1$ are connected to the potential $+V_c$ respectively through resistors $R18_1$ and $R18_2$. The trigger signal $E18_1$ is derived from the collector of the transistor $Q18_1$. The components $C18_1$, $Q18_1$, $R18_1$ and $R18_2$ constitute the wave shaper $18_1$.

The signal $E18_1$ is supplied to the inverted input of an amplifier $A18$. The inverted input is grounded via a parallel circuit of a capacitor $C18_2$ and a resistor $R18_3$. The inverted input is also grounded via a series circuit of a resistor $R18_4$ and the emitter-collector path of a PNP transistor $Q18_2$. The base of the transistor $Q18_2$ is supplied with the time constant changing signal $E16$ through a resistor $R18_5$. The output of the amplifier $A18$ is connected through a resistor $R18_6$ to the non-inverted input thereof, and the non-inverted input is grounded via a series circuit of resistors $R18_7$ and $R18_8$. The junction point of the resistors $R18_7$ and $R18_8$ is connected through a resistor $R18_9$ to the potential $+V_c$.

The components $A18$, $Q18_2$, $C18_2$ and $R18_3$ to $R18_9$ constitute the variable time constant bistable multivibrator $18_2$. The hysteresis property of the multivibrator $18_2$ depends on the resistors $R18_6$ to $R18_9$ included in a positive feedback loop of the amplifier $A18$. The time constant depends on the capacitor $C18_2$ and the resistors $R18_3$, $R18_4$. That is, when the signal $E16$ is logical "1" at playback mode, the transistor $Q18_2$ is in OFF state. Therefore, the time constant is $C18_2 R18_3$. (If the input resistance of the amplifier $A18$ is as low as that of the resistor $R18_3$, the resistor $R18_3$ may be omitted. In this case the input resistance at the inverted input of the amplifier $A18$ is used for $R18_3$.)

On the other hand, when the signal $E16$ is logical "0" at FF mode, the transistor $Q18_2$ is in ON state, and the time constant is changed from $C18_2 R18_3$ to $C18_2 (R18_3 // R18_4)$. More precisely, if $C18_2 = 3.3$ $\mu F$, $R18_3 = 100$ K$\Omega$ and $R18_4 = 2.7$ K$\Omega$, for example, the time constant at the playback mode $= 330$ ms ($C18_2 R18_3$), whereas the time constant at the FF mode is $C18_2 (R18_3 // R18_4) \simeq 8.7$ ms.

Now it will be described why such time constant change is required.

In the case of playback mode, the signal $E18_1$ usually corresponds to a music source. If the music is a classical one, there sometimes appears a very low level part (pp~ppp) or no sound portion which lasts for a few seconds. Such low level or no sound portion should not be mistaken for a spacing portion between the adjacent music sources. To prevent mis-triggering the multivibrator $18_2$ due to such low or no sound portion of a few seconds, the time constant $C18_2 R18_3$ is selected so large.

On the other hand, in the case of FF (or REW) mode where the tape transport speed is so fast, as much as 30 to 40 times the playback speed, the time interval of the spacing portion will be approximately 0.1 to 0.2 second when the time interval of the spacing portion at the playback speed is 4 to 6 seconds. In this case, if the time constant of the multivibrator $18_2$ is as large as $C18_2 R18_3 = 330$ ms, the multivibrator $18_2$ cannot detect a spacing portion and cannot be triggered even though the spacing portion appears. The time constant at the FF mode must therefore be lowered to, e.g. $C18_2 (R18_3 // R18_4) \simeq 8.7$ ms.

The first signal $E18_2$ derived from the output of the amplifier $A18$ is applied to one end of a resistor $R18_{10}$. The other end of the resistor $R18_{10}$ is grounded via a capacitor $C18_3$ and a resistor $R18_{11}$. The junction point of the capacitor $C18_3$ and the resistor $R18_{11}$ is grounded through the cathode-anode path of a diode $D18_1$. The pulse signal $E18_3$ is obtained from the junction point of $C18_3$ and $R18_{11}$.

The components $R18_{10}$, $R18_{11}$, $C18_3$ and $D18_1$ constitute the wave shaper $18_3$. The diode $D18_{10}$ is provided for absorbing the negative surge of the signal $E18_3$. The signal $E18_3$ is applied to the first input of the AND gate $18_4$. The risk of destroying the input circuit element of the gate $18_4$ is removed by the absorbing operation of the diode $D18_1$.

The erroneous operation preventing signal $E22$ is applied to the first input of a NAND gate $G18_1$. The output of the NAND gate $G18_1$ is connected through a capacitor $C18_4$ to the first input of a NAND gate $G18_2$. The first input of the gate $G18_2$ is grounded via a resistor $R18_{12}$ and also via the cathode-anode path of a diode $D18_2$. The output of the gate $G18_2$ is fed back to the second input of the gate $G18_1$, and the second input of the gate $G18_2$ is applied with the potential $+V_c$ corresponding to logical value "1".

The second signal $E18_4$ derived from the output of the NAND gate $G18_2$ is applied to the second input of the AND gate $18_4$.

The components $G18_1$, $G18_2$, $C18_4$, $R18_{12}$ and $D18_2$ constitute the masking circuit or monostable multivibrator $18_5$. The AND gate $18_4$ provides the transport control signal E20.

With reference to FIG. 3 it will be briefly described how the FIG. 4 circuit operates. Suppose the tape transport mechanism $10_1$ is set to playback mode and that the operation playback mode is changed to FF mode. Since the mode change by the mechanism $10_1$ takes place inevitably with a time lag after the logical level changes of the signals E14 and E16 there is the risk that the multivibrator $18_2$ is erroneously triggered at the time of the mode change of the playback mode to the FF mode. The moment said mode change occurs, the cut-off frequency $f_c$ of the variable filter means 16 rises to, for example, 16 KHz and the time constant of the multivibrator $18_2$ is reduced to, for example, 8.7 ms, despite the fact that mechanism $10_1$ is still in playback mode. Evidently, the level of the timing signal E18, which depends on the playback signal E10 is instantaneously lowered and the multivibrator $18_2$ is changed to a state in which the multivibrator $18_2$ is easily triggered. Accordingly, even if the signal E10 include a music source (especially music played by a bass-instrument), the signal level at the inverted input of the amplifier A18 may become lower than that at the non-inverted input thereof, and the multivibrator $18_2$ is mis-triggered. There exists the possibility that the transport control signal E20 can be erroneously provided. Such an error may also be induced from a plunger noise, etc. The possibility of error can be completely removed by using the multivibrator (masking circuit) $18_5$ and the AND gate $18_4$. The operation of the multivibrator $18_5$ and the AND gate $18_4$ is as follows.

Now we assume that a time required for the complete mechanical mode change operation in the mechanism $10_1$ is 600 ms at most, that the pulse width of the signal $E18_3$ is 40 ms and that the signals $E18_3$ and $E18_4$ appear almost at the same time. Where the time constant of the multivibrator $18_5$ is so selected that the pulse width of the signal $E18_4$ is, for example, 750 ms, the margin of 150 ms (=750 ms−600 ms) is considered to prevent an unexpected erroneous operation.

On this assumption we operate the control logic $10_2$ so as to change the playback mode to the FF mode in the mechanism $10_1$. The multivibrator $18_5$ is instantly triggered by the erroneous operation preventing signal E22. Immediately thereafter the multivibrator $18_5$ produces the signal $E18_4$ having logical value "0" and a pulse width of 750 ms. As long as the signal $E18_4$ has a logical level of "0", the AND gate $18_4$ is closed. Therefore, the gate $18_4$ stops the signal $E18_3$ if produced by said mis-triggering. The AND gate $18_4$ passes the signal $E18_3$ after the logical level of the signal $E18_4$ returns to "1".

Figure 5:
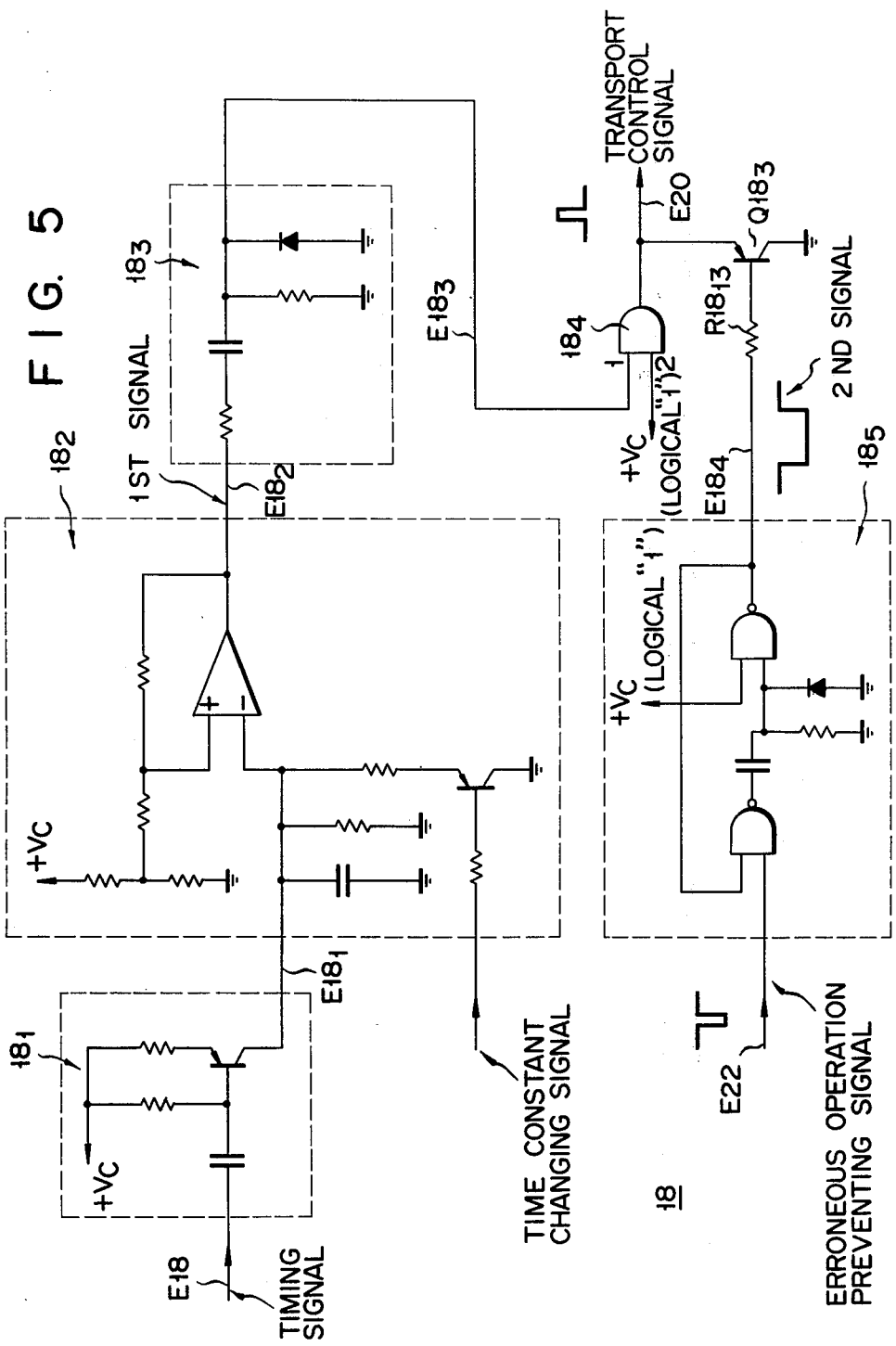
FIG. 5 shows a modification of the circuit configuration shown in FIG. 4.

FIG. 5 is a modification of FIG. 4 configuration. In the modification the AND gate $18_4$ is used as a buffer. The gating for the transport control signal E20 is performed by a PNP transistor $Q18_3$. The emitter of the transistor $Q18_3$ is connected to the output of the gate or buffer $18_4$ and the collector thereof is grounded. To the base of the transistor $Q18_3$ the second signal $E18_4$ is applied through a resistor $R18_{13}$. As long as the signal $E18_4$ is logical "0", the output of the buffer $18_4$ is shunted to ground via the emitter-collector path of the transistor $Q18_3$ which is in ON state. Accordingly the function of the FIG. 5 configuration is substantially the same as that of FIG. 4.

Figure 6B:
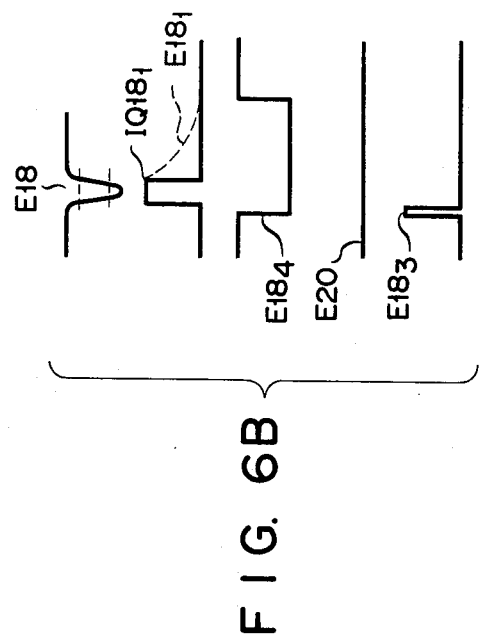
FIG. 6B shows wave forms at the corresponding points of the configuration shown in FIG. 4 or 5 wherein the masking circuit $18_5$ is provided.
Figure 6A:
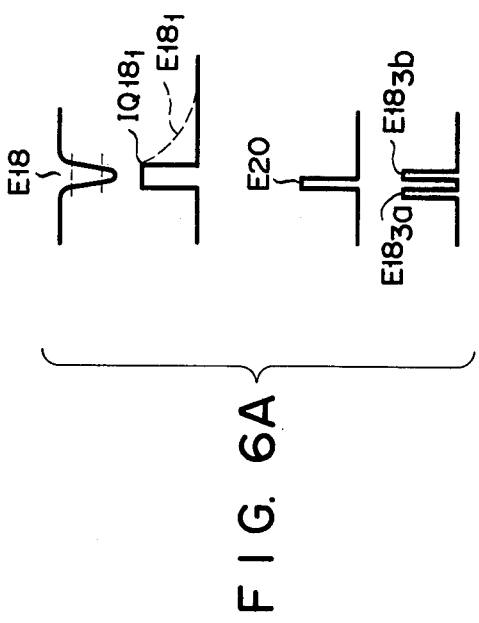
FIG. 6A shows wave forms at the corresponding points of the circuit configuration shown in FIG. 4 or 5 wherein the masking circuit $18_5$ is not provided.

FIGS. 6A and 6B show wave forms at the corresponding points of the circuit configuration of FIG. 4 or 5. FIG. 6A shows wave forms obtained when the multivibrator $18_5$ is not provided, and FIG. 6B is wave forms obtained when the multivibrator $18_5$ is provided. In these figures, the wave form $IQ18_1$, corresponds to the collector current of the transistor $Q18_1$ of the wave shaper $18_1$.

In FIG. 6A, pulses $E18_{3a}$ and $E18_{3b}$ are erroneous signals as described before with reference to FIGS. 4 and 5. That is, if the multivibrator $18_5$ is used as mere buffer, said mis-triggering occurs at the variable time constant Schmitt trigger $18_2$. If this happens, the pulse $E18_{3a}$ appears and the pulse $E18_{3a}$ passes through the gate $18_4$ as the erroneous transport control signal E20. This erroneous signal E20 erroneously instructs the transport control logic $10_2$, and when transport control logic $10_2$ is erroneously signaled, the control logic $10_2$, for example, stops the tape transport mechanism $10_1$, which again produces the erroneous pulse $E18_{3b}$.

By contrast, when the AND gate $18_4$ does not pass the pulse $E18_3$ while the second signal $E18_4$ remains logical "0", no erroneous transport control signal E20 appears as illustrated in FIGS. 4 and 5.

FIGS. 7A and 7B are timing charts explaining the operation of the masking circuit $18_5$. In these figures, a reference time or a start point of time counting is selected at the rising edge of the instruction signal IS. As shown in FIG. 3, the signal IS is transferred between the tape transport mechanism $10_1$ and the transport control logic $10_2$. Here the signal IS is to be an instruction for changing the operation mode from playback mode to FF mode. The signal IS causes the logical level change in the transport operation control signal E12 from "1" to "0". FIGS. 7A and 7B may suggest that the masking period, i.e. the pulse width of the second signal $E18_4$, is at least 200 ms, preferably about 300 to about 400 ms. However, a masking period of 200 ms or even a masking period of 400 ms is not long enough to prevent said erroneous operation completely.

In some tape transport mechanisms, e.g. a mechanism provided with said model PC-X40, the playback signal E10 is muted on a rare occasion after the mode change from playback to FF, for the reason which will be latter described with reference to FIG. 8. This muting period is denoted by "TM" in FIG. 7B. From the FIGS. 7A and 7B it may be concluded that the masking period or the pulse width of the second signal $E18_4$ should be at least 550 ms, and preferably 750 ms, in said model PC-X40.

FIG. 8 explains said muting phenomenon. A mode change lever 20 pivoted by a shaft 22 is seesawed by a rotation plate 24. That is, when the plate 24 rotates to CW, a mechanical interlocking portion $20_1$ is moved down by the mechanical driving through rotation of a projection or pin $24_1$ inserted in a cam slot $20_2$. The portion $20_1$ is moved up when the plate 24 rotates to CCW. In the mechanics shown in FIG. 8 optional overstrokes can be obtained with suitable mechanical design.

When the operation mode in the tape transport mechanism $10_1$ is changed from playback (point a) to FF or REW (point c), the mechanical motion of the lever 20 starts shifting from points a to c via a point b and stops at the point c. Here L1 denotes a first over-stroke.

On the other hand, when the operation mode is changed from FF or REW to playback, the lever 20 starts shifting from points c to a via a point d and stops at the point a. In this case L2 indicates a second over-stroke.

The over-strokes L1 and L2 help to secure the mechanical operation. Especially the over-stroke L1 causes the head $10_{1a}$ to detach from the music tape. Such detachment causes said muting phenomenon. With respect to these operates the mechanics are described more detail in Japanese Patent Application No. 25444/79 and Japanese Utility Model Applications No. 27757/79 and No. 27758/79.

In the above-mentioned case the first over-stroke L1 is larger than the second over-stroke L2, though the mode change cycle between playback mode to FF (or REW) mode or vice versa is always constant. L1 is greater than L2 (L1>L2) because the time delay for mechanical mode change from FF (or REW) mode to playback mode should necessarily be short, preferably within 30 ms, in order to avoid too long of a masking period.

Figure 9:
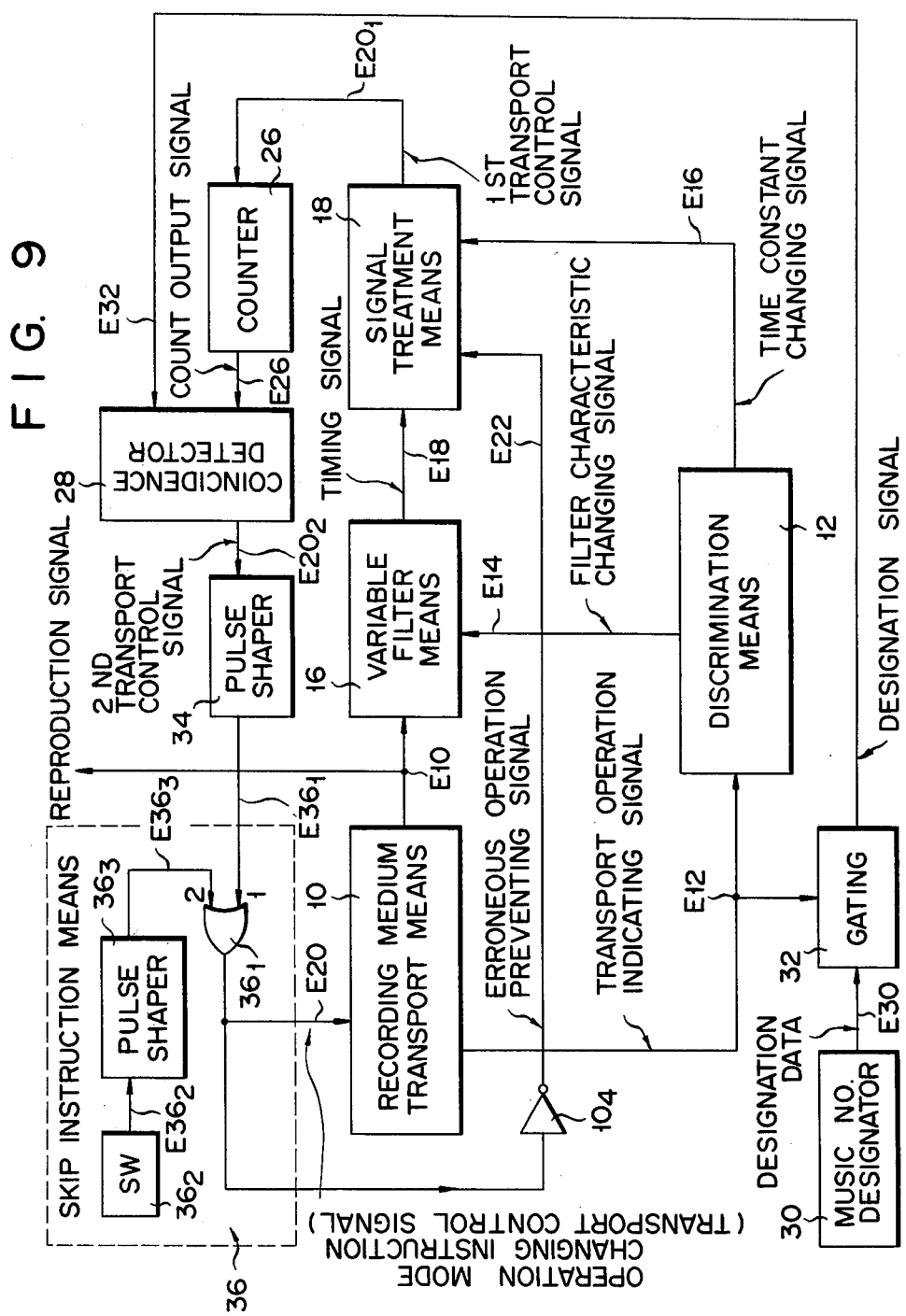
FIG. 9 shows another embodiment of the invention.

FIG. 9 shows another embodiment of the invention, or a modification of the configuration shown in FIG. 1 or 3. The components 10 to 18 have already been explained with reference to FIGS. 1 and 3. The explanation will therefore be directed to other components. The signal treatment means 18 provides a first transport control signal $E20_1$ in accordance with the provision of the timing signal E18 and the erroneous operation preventing signal E22. The signal $E20_1$ is supplied to a counter 26. The counter 26 produces a count output signal E26 corresponding to the count. The signal E26 is supplied to a coincidence detector 28.

The embodiment of FIG. 9 is also provided with a source number or music number designator 30. The designator 30 provides a designation data E30 to a gating circuit 32. The circuit 32 gates or selects music numbers in accordance with the contents and the logical level of the transport operation indicating signal E12 and thus provides a designation signal E32. The signal E32 is supplied to the detector 28 and is compared with the signal E26 therein. The detector 28 provides a second transport control signal $E20_2$ when the signal E26 coincides with or corresponds to the signal E32. The signal $E20_2$ is converted to a pulse signal $E36_1$ by a pulse shaper 34.

The signal $E36_1$ is applied to the first input of an OR gate $36_1$. The second input of the OR gate $36_1$ is supplied with a skip pulse $E36_3$ derived from a pulse shaper $36_3$. The pulse $E36_3$ corresponds to a skip instruction signal $E36_2$ obtained from a skip switch $36_2$. The OR gate provides an operation mode changing instruction, i.e. the transport control signal E20 to the recording medium transport means 10. The signal E20 is usually employed for a plunger driving pulse to change the mechanical operation mode. Accordingly, the signal E20 is provided with the logical "1" of the signal $E36_1$ or the signal $E36_3$, i.e. the signal E20 always occurs when the switch $36_2$ is turned-on or when the signal $E20_2$ is provided. More practically, when the switch $36_2$ is turned on, the operation mode of the tape transport mechanism $10_1$ (FIG. 3) is changed (PLAY⇌FF or REW).

In a service data of said model PC-X40 the switch $36_2$ is indicated by "PLAY/SKIP button". The components $36_1$, $36_2$ and $36_3$ constitute a skip instruction means 36. The signal E20 is level-inverted by an inverter $10_4$ and the inverter $10_4$ provides the erroneous operation preventing signal E22 to the signal treatment means 18.

The configuration of FIG. 9 can perform an automatic multi-music selection. Suppose the designator 30, which corresponds "Music selection buttons" of said PC-X40, designates music numbers 1, 3 and 5 and that the present operation mode of the tape transport mechanism $10_1$ is playback mode. In this case the gating circuit 32 applied with the signal E12 of logical "1" does not pass the designation data E30 of 1, 3 and 5. That is, the designation signal E32 includes the data of 2, 4, 6 . . . . Then, the second transport control signal $E20_2$ appears after the music sources of 1st, 3rd and 5th, and the music sources of 2nd, 4th, 6th . . . are skipped by FF operation. On the other hand, if the mechanism $10_1$ is changed from playback mode to FF mode while the 1st music source is played, the signal E12 of logical "0" is applied to the gating circuit 32. In this case the circuit 32 selects the designation data E30 of 1, 3 and 5. That is, the signal E30 includes the data of 1, 3 and 5. Then, the control signal $E20_2$ appears after the 1st, 2nd and 4th music sources, and the remaining portion of the 1st music source and the music sources of 2nd and 4th are skipped, and 3rd and 5th music sources are played back.

FIG. 10 shows a modification of the variable filter means 16 in which the cut-off frequency $f_c$ is varied according to the tape transport speed. A supply reel shaft of the tape transport mechanism $10_1$ is interlocked with a rotary magnet ring $19_{1b}$, and the ring $10_{1b}$ rotates with the supply reel shaft. The ring $10_{1b}$ therefore rotates during the tape transport.

The rotation of the ring $10_{1b}$ is detected by a Hall element $10_{1c}$. An output signal of the element $10_{1c}$, i.e. the transport speed indication signal E12, is amplified by an amplifier $10_{1d}$, wave-shaped by a wave shaper $10_{1e}$ and converted into an analog signal by a D/A converter $10_{1f}$, and then the filter characteristic changing signal E14 is obtained from the converter $10_{1f}$. Thus, the signal E14 corresponds to the tape transport speed.

The signal E14 is supplied through a resistor $R16_{14}$ to a LED $16_4$ whose cathode is connected to a negative power source $-V_E$. Optically coupled with the LED $16_4$ are CdS cells or variable resistance elements $R16_{10}$ and $R16_{12}$ which are responsive to the light from the LED $16_4$. The element $R16_{12}$ is connected between the inverted input and output of an amplifier $16_1$. The non-inverted input of the amplifier $16_1$ is grounded and the inverted input thereof is applied with the reproduction signal E10 through a series circuit of a capacitor C16 and the element $R16_{10}$. The output of the amplifier $16_1$ provides the timing signal E18.

The components $10_{1b}$ and $10_{1c}$ constitute a means for issuing a transport speed indicating signal corresponding to the transport speed of the recording medium. The components $10_{1d}$ to $10_{1f}$ constitute a means for converting the transport speed indicating signal to the filter characteristic changing signal.

The components C16, $R16_{10}$, $R16_{12}$ and $16_1$ constitute the variable filter means 16. The transfer function G16 of the means 16 can be represented as follows:

$$G16 = -\frac{SC16R16_{12}}{SC16R16_{10}+1} = -\frac{T5}{T6+1} \quad (10)$$

where $S=j2\pi f(Hz)$, $T5=C16R16_{12}$ and $T6=C16R16_{10}$. The maximum gain of the function G16 is obtained from the equation (10) as follows:

$$\lim_{S\to\infty} G16 = -\frac{T5}{T6} = -\frac{R16_{12}}{R16_{10}} \quad (11)$$

or $$|G16_{max}| = 20\log_{10}\left(\frac{R16_{12}}{R16_{10}}\right) \quad (11A)$$

The cut-off frequency $f_c$ at the level of $-3$ dB point from $|G16_{max}|$ is also obtained from the equation (10):

$$f_c = \frac{1}{2\pi T6} = \frac{1}{2\pi C16R16_{10}} \quad (12)$$

When the tape transport speed becomes high, the signal level of E14 becomes also high level. This enhances the light intensity from the LED16$_4$ and reduces the resistance of the element R16$_{10}$. Accordingly, as evident from equation (12), the cut-off frequency $f_c$ continuously rises as the tape transport speed increases. If the optical properties of the elements R16$_{10}$ and R16$_{12}$ are substantially the same, the ratio R16$_{12}$/R16$_{10}$ in equation (11) will be almost constant, regardless of the tape transport speed.

FIG. 10A shows a partial modification of FIG. 10. In this modification a rotary magnet ring 10$_{1b}$ is interlocked with a roller 10$_{1g}$ which contact with a magnetic tape. The Hall element 10$_{1c}$ therefore provides a transport speed control signal E12 directly proportional to the tape transport speed. Thus, the variation of the cut-off frequency $f_c$ corresponds to real tape transport speed, not to the rotation speed of the reel shaft.

Figure 11:
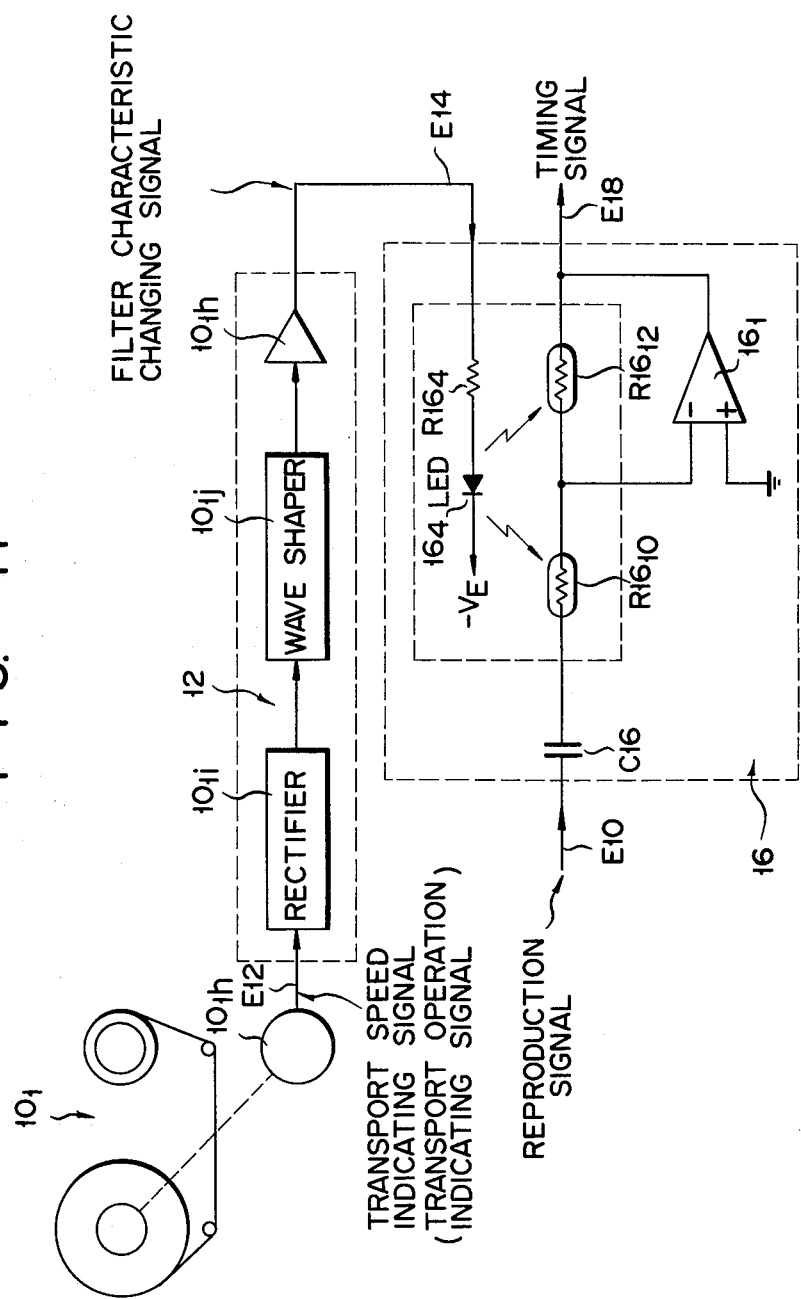

FIG. 11 shows a modification of FIG. 10. In this modification a frequency generator or AC generator 10$_{1h}$ interlocking with a supply reel shaft is used for issuing a transport speed indicating signal E12 corresponding to the transport speed of the tape. A generation output (e.m.f.) of the generator 10$_{1h}$, i.e. the signal E12 is rectified by a rectifier 10$_{1i}$, wave-shaped by a wave shaper 10$_{1j}$ and amplified by an amplifier 10$_{1k}$, whereby the filter characteristic changing signal E14 is obtained from the amplifier 10$_{1k}$. The function of FIG. 11 configuration is substantially the same as that of FIG. 10.

FIGS. 12 to 18 show various modifications of the variable filter means 16. In the case of FIG. 3, the cut-off frequency $f_c$ is varied by changing the capacitance "C16$_1 \rightleftarrows$(C16$_1$+C16$_2$)". In the case of FIG. 12, this change is achieved by changing the capacitance "C16$_1 \rightleftarrows$C16$_2$" by means of a switch 16$_5$ which closes in response the signal E14.

In the case of FIG. 13, resistances in the negative feedback loop are changed, instead of changing the capacitors. The output of an amplifier 16$_1$ is connected to the inverted input thereof via a resistor R16$_{19}$. The inverted input is grounded through a series circuit of a resistor R16$_{2a}$ and a capacitor C16. The junction point of the resistor R16$_{2a}$ and the capacitor C16 is connected to the output of the amplifier 16$_1$ through a series circuit of resistors R16$_{2b}$ and R16$_{1b}$. Connected between the inverted input of the amplifier 16$_1$ and the junction point of the resistors R16$_{2b}$ and R16$_{1b}$ is a switch 16$_6$. When the switch 16$_6$ is turned on, the composite resistances R16$_{2a}$//R16$_{2b}$ and R16$_{1a}$//R16$_{1b}$ are made to correspond to the resistances R16$_2$ and R16$_1$ of FIG. 3 or 12, respectively, at this time the cut-off frequency $f_{c1}$ and the maximum gain G16$_1$ are:

$$f_{c1} = \frac{1}{2\pi C16(R16_{2a}//R16_{2b})} \quad (13)$$

$$G16_1 = \frac{R16_{1a}//R16_{1b}}{R16_{2a}//R16_{2b}} \quad (14)$$

On the other hand, when the switch 16$_6$ is turned off and a relation R16$_{2a}$<<(R16$_{2b}$+R16$_{1b}$) is satisfied, the cut-off frequency $f_{c2}$ and the maximum gain G16$_2$ are:

$$f_{c2} \simeq \frac{1}{2\pi C16 R16_{2a}} \quad (15)$$

$$G16_2 \simeq \frac{R16_{1a}}{R16_{2a}} \quad (16)$$

In the configuration of FIG. 13, it is possible to arrange G16$_1 \simeq$G16$_2$. Thus, from equation (14)$\simeq$equation (16), the following relation is obtained:

$$R16_{1b}(R16_{2a}+R16_{2b}) \simeq R16_{2b}(R16_{1a}+R16_{1b}) \quad (17)$$

For example, if the resistors are so selected that R16$_{2a}$=10 KΩ, R16$_{2b}$=220Ω, R16$_{1a}$=3.3 MΩ and R16$_{1b}$=68 KΩ, the relation G16$_1 \simeq$G16$_2$ is practically satisfied.

Figures 14, 15:
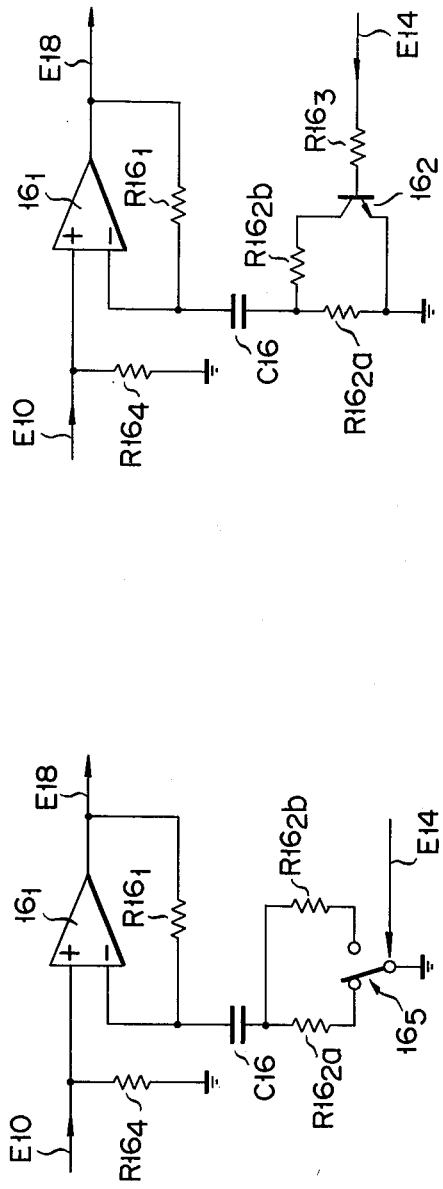

In the case of FIG. 14 the cut-off frequency $f_c$ is varied by changing the resistances "R16$_{2a} \rightleftarrows$R16$_{2b}$" by means of a switch 16$_5$.

In the case of FIG. 15 a switch transistor 16$_2$ is used for the switch 16$_5$ of FIG. 14. In this case the cut-off frequency $f_c$ is varied by changing the resistances "R16$_{2a} \rightleftarrows$(R16$_{2a}$//R16$_{2b}$)" by the ON-OFF operation of the transistor 16$_2$.

Figure 16:
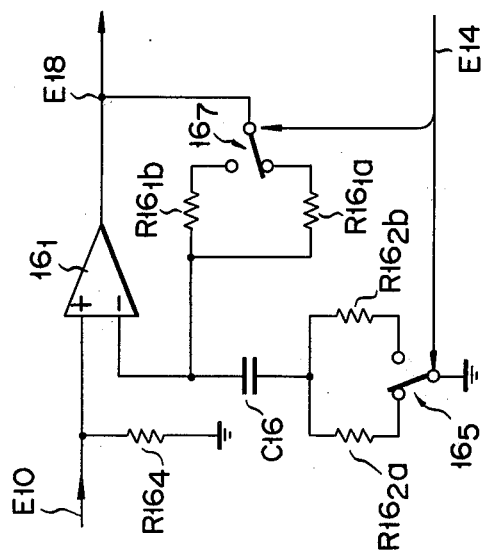

In the case of FIG. 16 the cut-off frequency $f_c$ is varied by changing the resistances "R16$_{2a} \rightleftarrows$R16$_{2b}$", and the maximum gain G16 is varied by changing the resistances "R16$_{1a} \rightleftarrows$R16$_{1b}$".

Figure 17:
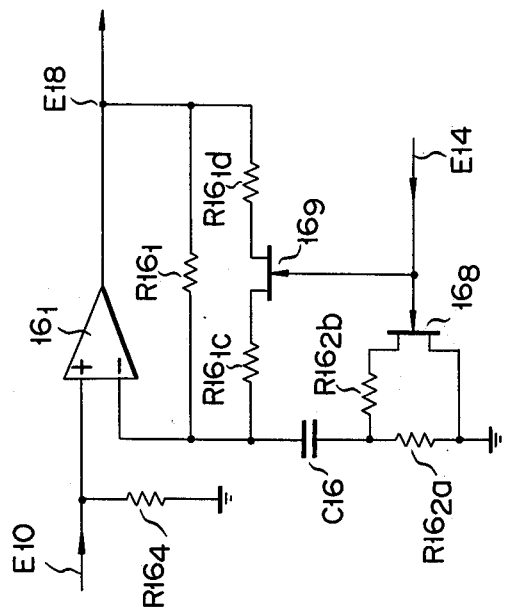
Figure 19:
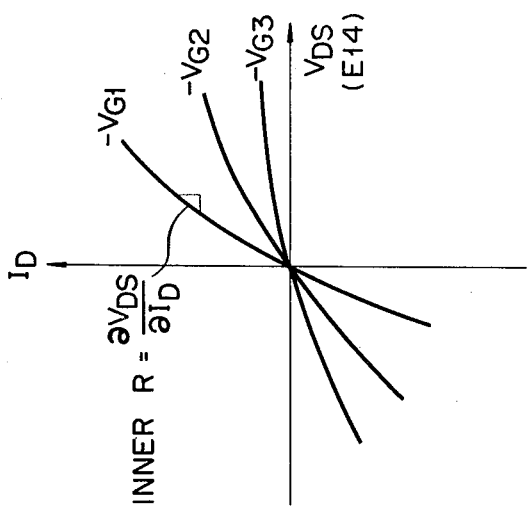
FIG. 19 shows a typical characteristic of FET used for a variable impedance element shown in FIG. 17 or 18, whose inner resistance $R = \partial V_{DS}/\partial I_D$ is varied in accordance with the gate potential $-V_G$.

In the case of FIG. 17 the cut-off frequency $f_c$ is varied by changing the inner resistance of an FET 16$_8$, and the maximum gain G16 is varied by changing the inner resistance of an FET 16$_9$. The inner resistances of the FETs 16$_8$ and 16$_9$ depend on the potential level of the signal E14$_1$ as shown in FIG. 19.

Figure 18:
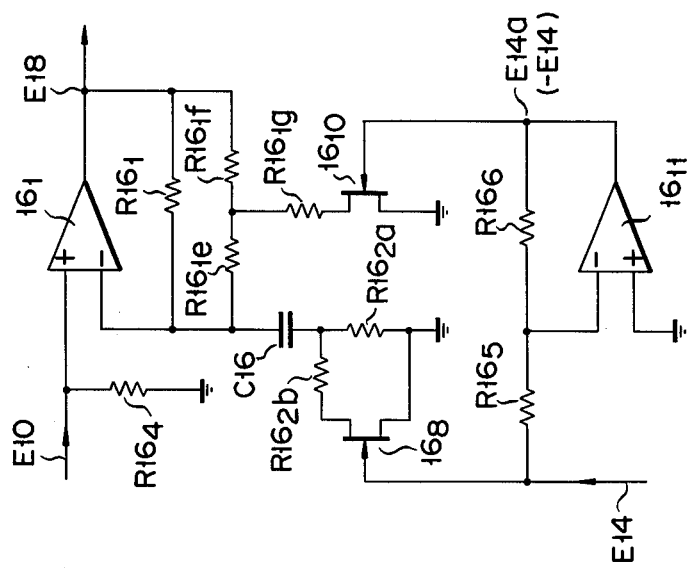

FIG. 18 shows a modification of FIG. 17. In this modification the maximum gain G16 is varied by changing the inner resistance of an FET 16$_{10}$. The gate potential of the FET 16$_{10}$, i.e. the signal level of a signal E14a, corresponds to $-$E14 or anti-phased signal of E14.

Although specific constructions have been illustrated and described herein, it is not intended that the invention be limited to the elements and constructions disclosed. One skilled in the art will recognize that other particular elements or subconstructions may be used without departing from the scope and spirit of the invention.

In addition, a more detailed embodiment of this invention is disclosed in the service data of model PC-X40

What is claimed is:

1. A detector for detecting a space between adjacent blocks of data recorded on a recording medium, comprising:
   (a) a recording medium transport means for transporting a recording medium with a given speed, said recording medium transport means having several operation modes and providing a reproduction signal corresponding to information recorded on the recording medium and a transport operation indicating signal identifying the operation mode of said transport means;
   (b) a discrimination means for discriminating the transport operation indicating signal, said discrimination means providing a filter characteristic changing signal and a time constant changing signal in accordance with the transport operation indicating signal;
   (c) a variable filter means for filtering the reproduction signal and providing a timing signal, the filtering characteristic of said variable filter means changing in accordance with the filter characteristic changing signal; and
   (d) a signal treatment means for treating the timing signal, said signal treatment means including a variable time constant bistable multivibrator triggered by the timing signal, the time constant of said bistable multivibrator being changed by the time constant changing signal, the signal treatment means also providing a first transport control signal corresponding to an output of the bistable multivibrator; wherein the operation mode of the recording medium transport means is changed in accordance with provision of the first transport control signal.

2. A detector of claim 1, further comprising:
   (i) a skip instruction means for changing the operation mode of the recording medium transport means, said skip instruction means instructing the first transport control signal.

3. A detector of claim 1, further comprising:
   (j) a skip instruction means for changing the operation mode of the recording medium transport means regardless of the second transport control signal.

4. A detector according to claim 1, further comprising:
   means for providing an erroneous operation preventing signal when the recording medium transport means is instructed to change its operation mode; and wherein
   the signal treatment means also includes a monostable multivibrator for providing a second signal within a predetermined period after the monostable multivibrator is triggered by the erroneous operation preventing signal and a logical AND circuit for providing the first transport control signal corresponding to the logical AND of the first and second signals;
   whereby the first transport control signal is delayed with respect to the predetermined period of the monostable multivibrator and an erroneous operation due to mechanical delay in the mechanism is prevented.

5. A detector according to claim 1, wherein a cut-off frequency ratio N of the variable filter means is defined as $$N=(f_{c1}/f_{c2})\gtrsim(V1/V2)$$

where V2 denotes a constant tape transport speed, V1 a speed of high speed tape transport, $f_{c2}$ a cut-off frequency of the filter means at which the tape transport speed is V2, $f_{c1}$ a cut-off frequency of the filter means at which the tape transport speed is V1; and wherein said discrimination means includes means to alter $f_{c1}$ and $f_{c2}$ in response to the transport operation indication signal.

6. A detector according to claim 1, wherein the recording medium transport means includes a mechanism for transporting the recording medium, said mechanism including means for issuing a transport speed indicating signal corresponding to the transport speed of the recording medium; wherein the discrimination means includes means for converting the transport speed indicating signal to the filter characteristic changing signal; and wherein the variable filter means includes a variable impedance element whose impedance is varied in accordance with the level of the filter characteristic changing signal.

7. A detector of claim 6, wherein a cut-off frequency ratio N of the variable filter means is defined as $$N=(f_{c1}/f_{c2})\gtrsim(V1/V2)$$

where V2 denotes a constant tape transport speed, V1 a speed of high speed tape transport, $f_{c2}$ a cut-off frequency of the filter means at which the tape transport speed is V2, $f_{c1}$ a cut-off frequency of the filter means at which the tape transport speed is V1; and wherein said discrimination means includes means for altering $f_{c1}$ and $f_{c2}$ in response to the transport operation indication signal.

8. A detector for detecting a space between adjacent blocks of data recorded on a recording medium, comprising:
   (a) a recording medium transport means for transporting a recording medium with a given speed, said recording medium transport means having several operation modes and providing a reproduction signal corresponding to information recorded on the recording medium and a transport operation indicating signal identifying the operation mode of said transport means;
   (b) a discrimination means for discriminating the transport operation indicating signal, said discrimination means providing a filter characteristic changing signal and a time constant changing signal in accordance with the transport operation indicating signal;
   (c) a variable filter means for filtering the reproduction signal and providing a timing signal, the filtering characteristic of said variable filter means changing in accordance with the filter characteristic changing signal;
   (d) a signal treatment means for treating said timing signal, said signal treatment means including a variable time constant bistable multivibrator triggered by the timing signal, the time constant of said bistable multivibrator being changed by the time constant changing signal, the signal treatment means also providing a first transport control signal corresponding to an output of the bistable multivibrator;

(e) a counter for counting the first transport control signal to provide a count output signal;

(f) a source number designator for providing designation data corresponding to desired sources, wherein a source constitutes one group of relevant information and is recorded on the recording medium in the form of a block;

(g) a gating circuit responsive to said transport operation indicating signal for gating the designation data, the output of said gating circuit becoming a designation signal when the transport operation indicating signal is applied to the gating circuit; and (h) a coincidence detector for comparing the designation signal and the count output signal to provide a second transport control signal when the count output signal equals or corresponds to the designation signal; wherein the operation mode of the recording medium transport means is changed in accordance with the second transport control signal.

9. A detector of claim 8, further comprising:

(i) a skip instruction means for changing the operation mode of the recording medium transport means, said skip instructions means instructing the transport means to change the operation mode, regardless of the first transport control signal.

10. A detector of claim 8, further comprising:

(j) a skip instruction means for changing the operation mode of the recording medium transport means regardless of the second transport control signal.

11. A detector according to any one of claims 9, 10 and 8, wherein a cut-off frequency ratio N of the variable filter means is defined as $$N32\ (f_{c1}/f_{c2}) \gtreqless (V1/V2)$$

where $V2$ denotes a constant tape transport speed, $V1$ a speed of high speed tape transport, $f_{c2}$ a cut-off frequency of the filter means at which the tape transport speed is $V2$, $f_{c1}$ a cut-off frequency of the filter means at which the tape transport speed is $V1$; and wherein said discrimination means includes means to alter $f_{c1}$ and $f_{c2}$ in response to the transport operation indication signal.

12. A detector according to any one of claims 9, 10 and 8, wherein the recording medium transport means includes a mechanism for transporting the recording medium, said mechanism including means for issuing a transport speed indicating signal corresponding to the transport speed of the recording medium; wherein the discrimination means includes means for converting the transport speed indicating signal to the filter characteristic changing signal; and wherein the variable filter means includes a variable impedance element whose impedance is varied in accordance with the level of the filter characteristic changing signal.

13. A detector of claim 12, wherein a cut-off frequency ratio N of the variable filter means is defined as $$N = (f_{c1}/f_{c2}) \gtreqless (V1/V2)$$

where $V2$ denotes a constant tape transport speed, $V1$ a speed of high speed tape transport, $f_{c2}$ a cut-off frequency of the filter means at which the tape transport speed is $V2$, $f_{c1}$ a cut-off frequency of the filter means at which the tape transport speed is $V1$; and wherein said discrimination means includes means for altering $f_{c1}$ and $f_{c2}$ in response to the transport operation indication signal.

14. A detector according to any one of claims 9, 10, and 8, further comprising:

(k) means for providing an erroneous operation preventing signal when the recording medium transport means is instructed to change its operation mode; and wherein (l) the signal treatment means also includes a monostable multivibrator for providing a second signal within a predetermined period after the monostable multivibrator is triggered by the erroneous operation preventing signal and a logical AND circuit for providing the first transport control signal corresponding to the logical AND of the first and second signals;

whereby the first transport control signal is delayed with respect to the predetermined period of the monostable multivibrator and an erroneous operation due to mechanical delay in the mechanism is prevented.

15. A detector of claim 4, wherein a cut-off frequency ratio of N of the variable filter means is defined as $$N = (f_{c1}/f_{c2}) \gtreqless (V1/V2)$$

where $V2$ denotes a constant tape transport speed, $V1$ a speed of high speed tape transport, $f_{c2}$ a cut-off frequency of the filter means at which the tape transport speed is $V2$, $f_{c1}$ a cut-off frequency of the filter means at which the tape transport speed is $V1$; and wherein said discrimination means includes means for altering $f_{c1}$ and $f_{c2}$ in response to the transport operation indication signal.

16. A detector of claim 4, wherein the recording medium transport means includes a mechanism for transporting the recording medium, said mechanism including means for issuing a transport speed indicating signal corresponding to the transport speed of the recording medium; wherein the discrimination means includes means for converting the transport speed indicating signal to the filter characteristic changing signal; and wherein the variable filter means includes a variable impedance element whose impedance is varied in accordance with the level of the filter characteristic changing signal.

17. A detector of claim 16, wherein a cut-off frequency ratio N of the variable filter means is defined as $$N = (f_{c1}/f_{c2}) \gtreqless (V1/V2)$$

where $V2$ denotes a constant tape transport speed, $V1$ a speed of high speed tape transport, $f_{c2}$ a cut-off frequency of the filter means at which the tape transport speed is $V2$, $f_{c1}$ a cut-off frequency of the filter means at which the tape transport speed is $V1$; and wherein said discrimination means includes means for altering $f_{c1}$ and $f_{c2}$ in response to the transport operation indication signal.

18. A detector for detecting a space between adjacent blocks of data recorded on a recording medium, comprising:

(a) a recording medium transport means for transporting a recording medium with a given speed, said recording medium transport means having several operation modes and providing a reproduction signal corresponding to information recorded on the recording medium and a transport operation indicating signal identifying the operation mode of said transport means;

(b) a discrimination means for discriminating the transport operation indicating signal, said discrimination means providing a filter characteristic changing signal in accordance with the transport operation indicating signal;

(c) a variable filter means for filtering the reproduction signal and providing a timing signal, the filtering characteristic of said variable filter means changing in accordance with the filter characteristic changing signal; and wherein the operation mode of the recording medium transport means is changed by a transport control signal corresponding to the timing signal.

19. A detector of claim 18, wherein the reproduction signal includes a no-signal portion, and when the no-signal portion is present in said reproduction signal, the variable filter means provides the timing signal which causes the corresponding transport control signal to change the operation mode of the recording medium transport means.

20. A detector of claim 18 or 19, wherein the recording medium transport means includes means for changing the transport operation indicating signal in accordance with the given speed of the recording medium.

21. A detector of claim 20, wherein the variable filter means includes a low cut type filter whose cut-off frequency is changed in accordance with the filter characteristic changing signal from a predetermined low value to a predetermined high value when the given speed of the recording medium transport means is changed from a predetermined constant speed to a higher speed.

22. A detector of claim 21, wherein a cut-off frequency ratio N of the variable filter means is defined as $$N = (f_{c1}/f_{c2}) \gtrsim (V1/V2)$$

where V2 denotes a constant tape transport speed, V1 a speed of high speed tape transport, $f_{c2}$ a cut-off frequency of the filter means at which the tape transport speed is V2, $f_{c1}$ a cut-off frequency of the filter means at which a tape transport speed is V1; and wherein the discrimination means alters $f_{c1}$ and $f_{c2}$ in response to the transport operation indication signal.

23. A detector of claim 21, wherein the recording medium transport means includes a mechanism for transporting the recording medium, said mechanism including means for issuing a transport speed indicating signal corresponding to the transport speed of the recording medium; wherein the discrimination means includes means for converting the transport speed indicating signal to the filter characteristic changing signal; and wherein the variable filter means includes a variable impedance element whose impedance is varied in accordance with the level of the filter characteristic changing signal.

24. A detector of claim 23, wherein a cut-off frequency ratio N of the variable filter means is defined as $$N = (f_{c1}/f_{c2}) \gtrsim (V1/V2)$$

where V2 denotes a constant tape transport speed, V1 a speed of high speed tape transport, $f_{c2}$ a cut-off frequency of the filter means at which the tape transport speed is V2, $f_{c1}$ a cut-off frequency of the filter means at which the tape transport speed is V1; and wherein said discrimination means includes means for altering $f_{c1}$ and $f_{c2}$ in response to the transport operation indication signal.

25. A detector of claim 21, wherein the variable filter means includes a high pass filter of $-6$ dB/oct type, and the cut-off frequency at the predetermined constant speed is set at the predetermined low value.

26. A detector of claim 25, wherein the recording medium transport means includes a mechanism for transporting the recording medium, said mechanism including means for issuing a transport speed indicating signal corresponding to the transport speed of the recording medium; wherein the discrimination means includes means for converting the transport speed indicating signal to the filter characteristic changing signal; and wherein the variable filter means includes a variable impedance element whose impedance is varied in accordance with the level of the filter characteristic changing signal.

27. A detector of claim 25, wherein a cut-off frequency ratio N of the variable filter means is defined as $$N = (f_{c1}/f_{c2}) \gtrsim (V1/V2)$$

where V2 denotes a constant tape transport speed, V1 a speed of high speed tape transport, $f_{c2}$ a cut-off frequency of the filter means at which the tape transport speed is V2, $f_{c1}$ a cut-off frequency of the filter means at which the tape transport speed is V1; and wherein the discriminator means includes means for altering $f_{c1}$ and $f_{c2}$ in response to the transport operation indication signal.

28. A detector for detecting a space between adjacent blocks of data recorded on a recording medium, comprising:

(a) a recording medium transport means for transporting a recording medium with a given speed, said recording medium transport means having several operation modes and providing a reproduction signal corresponding to information recorded on the recording medium and a transport operation indicating signal identifying the operation mode of said transport means;

(b) a discrimination means for discriminating the transport operation indicating signal, said discrimination means providing a filter characteristic changing signal in accordance with the transport operation indicating signal;

(c) a variable filter means for filtering the reproduction signal and providing a timing signal, the filtering characteristic of said variable filter means changing in accordance with the filter characteristic changing signal; and (d) a signal treatment means responsive to the timing signal for providing a transport control signal to change the operation mode of the recording medium transport means.

29. A detector of claim 28, wherein the reproduction signal includes a no-signal portion, and when the no-signal portion is present in said reproduction signal, the variable filter means provides the timing signal which causes the signal treatment means to provide a transport control signal to change the operation mode of the recording medium transport means.

30. A detector of claim 28 or 29, wherein the recording medium transport means includes means for changing the transport operation indicating signal in accordance with the given speed of the recording medium.

31. A detector of claim 30, wherein the signal treatment means includes a variable time constant bistable multivibrator which is triggered by the timing signal, said signal treatment means providing a first signal corresponding to the transport control signal, the time constant of said multivibrator being changed by a time constant changing signal obtained from the discrimination means at the same time that the filter characteristic changing signal is provided.

32. A detector of claim 31, wherein the recording medium transport means includes a mechanism for transporting the recording medium and a control logic for controlling the operation of the mechanism, said control logic providing an erroneous operation preventing signal when the control logic instructs the mechanism to change the operation mode; and wherein the signal treatment means includes a monostable multivibrator for providing a second signal within a predetermined period after the monostable multivibrator is triggered by the erroneous operation preventing signal and a logical AND circuit for providing the transport control signal corresponding to the logical AND of the first and second signals;

whereby the timing of providing the transport control signal is delayed with respect to the predetermined period of the monostable multivibratory and an erroneous operation due to mechanical delay in the mechanism is prevented.

33. A detector of claim 30, wherein the variable filter means includes a low cut type filter whose cut-off frequency is changed in accordance with the filter characteristic changing signal from a predetermined low value to a predetermined high value when the given speed of the recording medium transport means is changed from a predetermined constant speed to higher speed.

34. A detector of claim 33, wherein the recording medium transport means includes a mechanism for transporting the recording medium, said mechanism including means for issuing a transport speed indicating signal corresponding to the transport speed of the recording medium; wherein the discrimination means includes means for converting the transport speed indicating signal to the filter characteristic changing signal; and wherein the variable filter means includes a variable impedance element whose impedance is varied in accordance with the level of the filter characteristic changing signal.

35. A detector of claim 33, wherein a cut-off frequency ratio N of the variable filter means is defined as $$N = (f_{c1}/f_{c2}) \gtrsim (V1/V2)$$

where V2 denotes a constant tape transport speed, V1 a speed of high speed tape transport, $f_{c2}$ a cut-off frequency of the filter means at which the tape transport speed is V2, $f_{c1}$ a cut-off frequency of the filter means at which the tape transport speed is V1; and wherein the discriminator means includes means for altering $f_{c1}$ and $f_{c2}$ in response to the transport operation indication signal.

36. A detector of claim 33, wherein the variable filter means includes a high pass filter of −6 dB/oct type, and the cut-off frequency at the predetermined constant speed is set at the predetermined low value.

37. A detector of claim 36, wherein the recording medium transport means includes a mechanism for transporting the recording medium, said mechanism including means for issuing a transport speed indicating signal corresponding to the transport speed of the recording medium; wherein the discrimination means includes means for converting the transport speed indicating signal to the filter characteristic changing signal; and wherein the variable filter means includes a variable impedance element whose impedance is varied in accordance with the level of the filter characteristic changing signal.

38. A detector of claim 36, wherein cut-off frequency ratio N of the variable filter means is defined as $$N = (f_{c1}/f_{c2}) \gtrsim (V1/V2)$$

where V2 denotes a constant tape transport speed, V1 a speed of high speed tape transport, $f_{c2}$ a cut-off frequency of the filter means at which the tape transport speed is V2, $f_{c1}$ a cut-off frequency of the filter means at which the tape transport speed is V1; and wherein the discriminator means includes means for altering $f_{c1}$ and $f_{c2}$ in response to the transport operation indication signal.

39. A detector of claim 28 or 29, wherein the signal treatment means includes a variable time constant bistable multivibrator which is triggered by the timing signal and provides a first signal corresponding to the transport control signal, the time constant of said multivibrator being changed by a time constant changing signal obtained from the discrimination means at the same time that the filter characteristic changing signal is provided.

40. A detector of claim 39, wherein the recording medium transport means includes a a mechanism for transporting the recording medium, said mechanism including means for issuing a transport speed indicating signal corresponding to the transport speed of the recording medium; wherein the discrimination means includes means for converting the transport speed indicating signal to the filter characteristic changing signal; and wherein the variable filter means includes a variable impedance element whose impedance is varied in accordance with the level of the filter characteristic changing signal.

41. A detector of claim 39, wherein a cut-off frequency ratio N of the variable filter means is defined as $$N = (f_{c1}/f_{c2}) \gtrsim (V1/V2)$$

where V2 denotes a constant tape transport speed, V1 a speed of high speed tape transport, $f_{c2}$ a cut-off frequency of the filter means at which the tape transport speed is V2, $f_{c1}$ a cut-off frequency of the filter means at which the tape transport speed is V1; and wherein said discrimination means includes means for altering $f_{c1}$ and $f_{c2}$ in response to the transport operation indication signal.

42. A detector of claim 39, wherein the recording medium transport means includes a mechanism for transporting the recording medium and a control logic for controlling the operation of the mechanism, said control logic providing an erroneous operation preventing signal when the control logic instructs the mechanism to change the operation mode; and wherein the signal treatment means includes a monostable multivibrator for providing a second signal within a predetermined period after the monostable multivibrator is triggered by the erroneous operation preventing signal and a logical AND circuit for providing the transport control signal corresponding to the logical AND of the first and second signals;

whereby the timing of the transport control signal is delayed with respect to the predetermined period of the monostable multivibrator and an erroneous operation due to mechanical delay in the mechanism is prevented.

43. A detector of claim 42, wherein the recording medium transport means includes a mechanism for transporting the recording medium, said mechanism including means for issuing a transport speed indicating signal corresponding to the transport speed of the recording medium; wherein the discrimination means includes means for converting the transport speed indicating signal to the filter characteristic changing signal; and wherein the variable filter means includes a variable impedance element whose impedance is varied in accordance with the level of the filter characteristic changing signal.

44. A detector of claim 42, wherein a cut-off frequency ratio N of the variable filter means is defined as $$N = (f_{c1}/f_{c2}) \gtrsim (V1/V2)$$

where V2 denotes a constant tape transport speed, V1 a speed of high speed tape transport, $f_{c2}$ a cut-off frequency of the filter means at which the tape transport speed is V2, $f_{c1}$ a cut-off frequency of the filter means at which the tape transport speed is V1; and wherein said discrimination means includes means for altering $f_{c1}$ and $f_{c2}$ in response to the transport operation indication signal.

45. A detector according to any one of claims 18, 28, 19 and 29 wherein a cut-off frequency ratio N of the variable filter means is defined as $$N = (f_{c1}/f_{c2}) \gtrsim (V1/V2)$$

where V2 denotes a constant tape transport speed, V1 a speed of high speed tape transport, $f_{c2}$ a cut-off frequency of the filter means at which the tape transport speed is V2, $f_{c1}$ a cut-off frequency of the filter means at which the tape transport speed is V1; and wherein said discrimination means includes means to alter $f_{c1}$ and $f_{c2}$ in response to the transport operation indication signal.

46. A detector according to any one of claims 18, 28, 19 and 29 wherein the recording medium transport means also includes a mechanism for transporting the recording medium, said mechanism including means for issuing a transport speed indicating signal corresponding to the transport speed of the recording medium; wherein the discrimination means also includes means for converting the transport speed indicating signal to the filter characteristic changing signal; and wherein the variable filter means also includes a variable impedance element whose impedance is varied in accordance with the level of the filter characteristic changing signal.

47. A detector of claim 46, wherein a cut-off frequency ratio N of the variable filter means is defined as $$N = (f_{c1}/f_{c2}) \gtrsim (V1/V2)$$

where V2 denotes a constant tape transport speed, V1 a speed of high speed tape transport, $f_{c2}$ a cut-off frequency of the filter means at which the tape transport speed is V2, $f_{c1}$ a cut-off frequency of the filter means at which the tape transport speed is V1; and wherein said discrimination means includes means for altering $f_{c1}$ and $f_{c2}$ in response to the transport operation indication signal.

* * * * *